US008559053B2

(12) United States Patent
Saisho et al.

(10) Patent No.: US 8,559,053 B2
(45) Date of Patent: Oct. 15, 2013

(54) OPTICAL SCANNING DEVICE AND IMAGE FORMING DEVICE

(75) Inventors: Kenichiroh Saisho, Tokyo (JP); Toshiaki Tokita, Kanagawa (JP); Nobuaki Kubo, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 210 days.

(21) Appl. No.: 13/053,762

(22) Filed: Mar. 22, 2011

(65) Prior Publication Data
US 2011/0235132 A1    Sep. 29, 2011

(30) Foreign Application Priority Data

Mar. 24, 2010  (JP) ................................. 2010-067143
Dec. 10, 2010  (JP) ................................. 2010-275254

(51) Int. Cl.
G06K 15/12    (2006.01)

(52) U.S. Cl.
USPC ........... 358/1.7; 358/1.1; 358/1.14; 358/3.26; 358/300; 347/118; 347/119; 347/120

(58) Field of Classification Search
None
See application file for complete search history.

(56) References Cited

U.S. PATENT DOCUMENTS

| 4,157,568 A * | 6/1979 | Ohki et al. ................. 369/44.24 |
| 4,952,815 A * | 8/1990 | Nishi ............................ 250/548 |
| 5,376,422 A * | 12/1994 | Kuribayashi et al. ........ 428/64.4 |
| 5,671,077 A * | 9/1997 | Imakawa et al. ........... 359/204.1 |
| 5,835,251 A * | 11/1998 | Toda et al. ................ 359/198.1 |
| 5,861,978 A | 1/1999 | Kamikubo |
| RE36,841 E * | 8/2000 | Arimoto et al. ................ 347/250 |
| 6,157,478 A * | 12/2000 | Naiki et al. ................. 359/204.1 |
| 6,342,976 B1 * | 1/2002 | Nomura et al. ............... 359/722 |
| 6,376,837 B1 | 4/2002 | Itabashi et al. |
| 6,641,878 B2 * | 11/2003 | Suzuki et al. ................ 428/35.7 |
| 7,245,430 B2 | 7/2007 | Kobayashi et al. |
| 7,301,554 B2 | 11/2007 | Kubo |
| 7,417,777 B2 | 8/2008 | Saisho et al. |
| 7,545,547 B2 | 6/2009 | Hayashi et al. |
| 7,616,364 B2 | 11/2009 | Saisho et al. |
| 7,663,657 B2 | 2/2010 | Ichii et al. |
| 7,672,032 B2 | 3/2010 | Hayashi et al. |
| 7,688,491 B2 | 3/2010 | Saisho et al. |
| 7,710,445 B2 | 5/2010 | Amada et al. |
| 7,800,641 B2 | 9/2010 | Kubo et al. |
| 7,817,177 B2 | 10/2010 | Hayashi et al. |

(Continued)

FOREIGN PATENT DOCUMENTS

JP     63-58315    3/1988
JP     6-3609      1/1994

(Continued)

Primary Examiner — Richard Zhu
(74) Attorney, Agent, or Firm — Oblon, Spivak, McClelland, Maier & Neustadt, L.L.P.

(57) ABSTRACT

An optical scanning device includes a light source that emits first and second light beams, and an optical splitter to which the first and second light beams deflected by an optical deflector are incident. Principal rays of the first and second light beams incident to the optical splitter are nonparallel to each other in a plane orthogonal to a main-scanning direction. Transmitted light from the optical splitter out of the first light beam and reflected light from the optical splitter out of the second light beam are guided to corresponding scanning target surfaces, and transmitted light from the optical splitter out of the second light beam and reflected light from the optical splitter out of the first light beam reach none of the scanning target surfaces.

20 Claims, 29 Drawing Sheets

(56) References Cited

U.S. PATENT DOCUMENTS

| | | | |
|---|---|---|---|
| 7,876,486 B2 | 1/2011 | Saisho et al. | |
| 7,889,224 B2 | 2/2011 | Hagiya et al. | |
| 8,045,248 B2* | 10/2011 | Watanabe et al. | 359/204.2 |
| 2001/0015813 A1* | 8/2001 | Sasaki | 358/1.7 |
| 2004/0021911 A1* | 2/2004 | Corson et al. | 358/463 |
| 2007/0216316 A1 | 9/2007 | Hirano et al. | |
| 2007/0253048 A1* | 11/2007 | Sakai et al. | 359/204 |
| 2008/0123159 A1* | 5/2008 | Hayashi et al. | 358/474 |
| 2008/0218827 A1* | 9/2008 | Watanabe et al. | 359/204 |
| 2008/0219601 A1 | 9/2008 | Arai et al. | |
| 2009/0052944 A1* | 2/2009 | Kubo et al. | 399/220 |
| 2009/0058979 A1 | 3/2009 | Saisho et al. | |
| 2009/0059337 A1* | 3/2009 | Saisho | 359/205 |
| 2009/0080907 A1* | 3/2009 | Hagiya et al. | 399/4 |
| 2009/0175656 A1* | 7/2009 | Kim et al. | 399/221 |
| 2009/0195636 A1* | 8/2009 | Arai et al. | 347/243 |
| 2009/0220256 A1 | 9/2009 | Suhara et al. | |
| 2009/0231557 A1 | 9/2009 | Kubo | |
| 2010/0060710 A1 | 3/2010 | Kubo | |
| 2010/0060963 A1 | 3/2010 | Miyake et al. | |
| 2010/0118366 A1 | 5/2010 | Tokita et al. | |
| 2010/0183337 A1 | 7/2010 | Kubo et al. | |
| 2010/0328417 A1 | 12/2010 | Saisho et al. | |
| 2011/0002025 A1 | 1/2011 | Tokita et al. | |

FOREIGN PATENT DOCUMENTS

| | | |
|---|---|---|
| JP | 6-27902 | 2/1994 |
| JP | 8-334719 | 12/1996 |
| JP | 2001-305456 | 10/2001 |
| JP | 2001-305457 | 10/2001 |
| JP | 2001-330790 | 11/2001 |
| JP | 4409213 | 11/2009 |
| JP | 2011-13289 | 1/2011 |

* cited by examiner

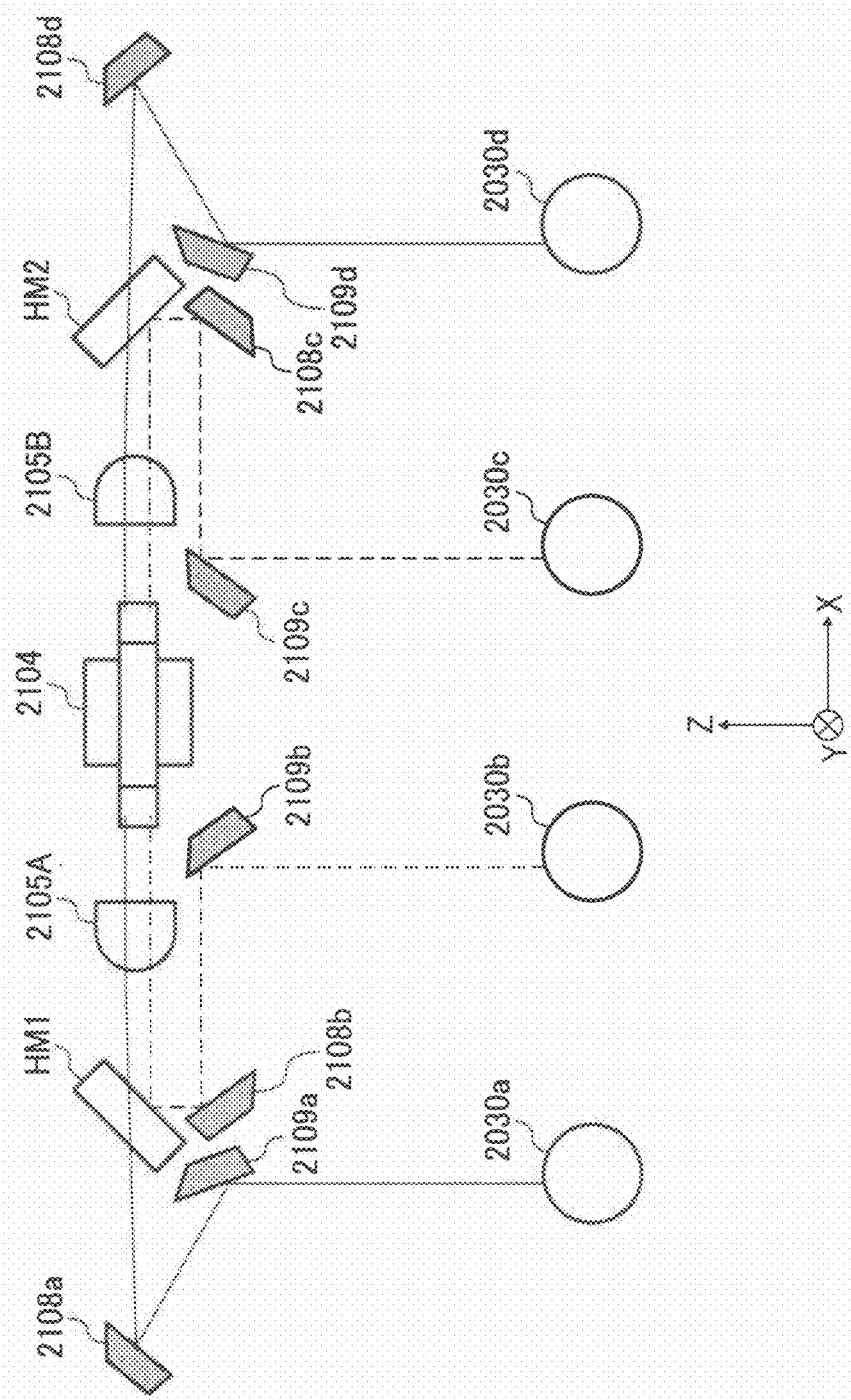

| | | RY | RZ | THICKNESS OR DISTANCE | REFRACTIVE INDEX |
|---|---|---|---|---|---|
| LIGHT SOURCE | | | | 12.455 | |
| COUPLING LENS | INCIDENT SURFACE | ∞ | ∞ | 2.98 | 1.515 (GLASS) |
| | OUTPUT SURFACE | −7.4212 | −7.4212 | 22.9 | |
| LINEAR IMAGE FORMING LENS | INCIDENT SURFACE | ∞ | 24.78 | 2 | 1.527 (RESIN) |
| | OUTPUT SURFACE | ∞ | ∞ | 48.59 | |
| DEFLECTIVE REFLECTION SURFACE | | ∞ | ∞ | | |

UNIT: mm

| | | RY | RZ | THICKNESS OR DISTANCE | REFRACTIVE INDEX |
|---|---|---|---|---|---|
| DEFLECTIVE REFLECTION SURFACE | | ∞ | ∞ | 41.2 | 1 |
| SCANNING LENS | INCIDENT SURFACE | 200 | 130 | 18 | 1.527 |
| | OUTPUT SURFACE | −196.881 | −24.955 | 30.8 | 1 |
| HALF MIRROR | INCIDENT SURFACE | ∞ | ∞ | 5 | 1.515 |
| | OUTPUT SURFACE | | | 181 | 1 |
| SCANNING TARGET SURFACE | | | | | |

UNIT: mm

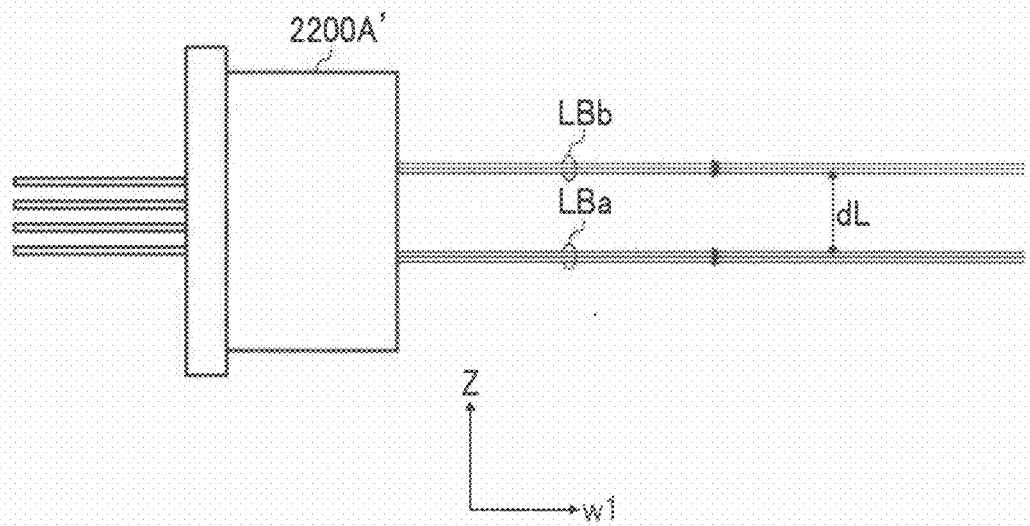
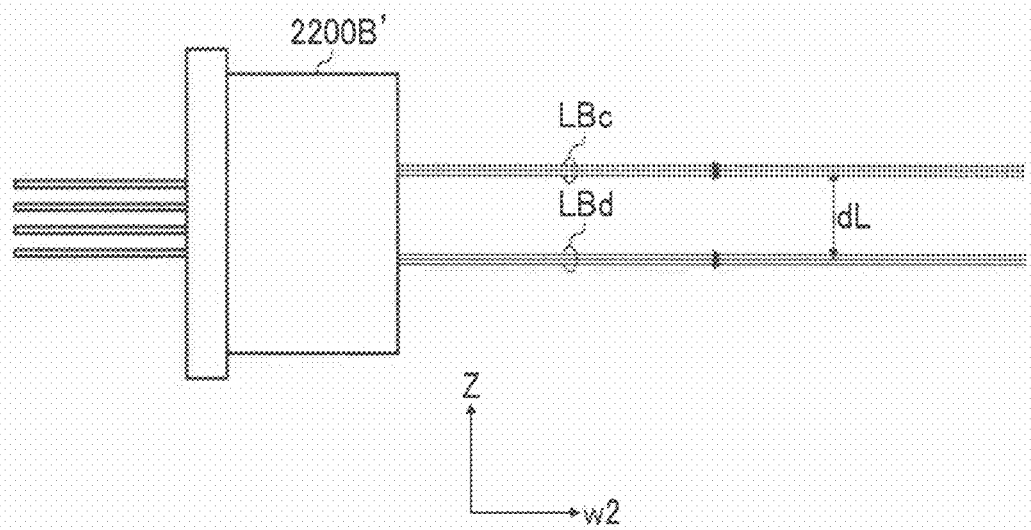

OPTICAL SCANNING DEVICE AND IMAGE FORMING DEVICE

CROSS-REFERENCE TO RELATED APPLICATIONS

The present application claims priority to and incorporates by reference the entire contents of Japanese Patent Application No. 2010-067143 filed in Japan on Mar. 24, 2010 and Japanese Patent Application No. 2010-275254 filed in Japan on Dec. 10, 2010.

BACKGROUND OF THE INVENTION

1. Field of the Invention

The present invention relates to an optical scanning device and an image forming device, and more particularly, to an optical scanning device in which a light beam scans a scanning target surface and an image forming device having such an optical scanning device.

2. Description of the Related Art

In the related art, an optical scanning device is widely used in image forming devices such as an optical printer, a digital copying machine, and an optical plotter. Concomitantly with the popularization of the image forming devices, it is strongly required for the image forming devices to be high in stability, resolution, and operation speed and to be realized with a reduced number of components in a reduced size.

Recently, a heterochromatic image forming device has been developed in which a plurality of color images are superimposed. Particularly, for realization of the heterochromatic image forming device, a tandem type is widely used in which a plurality of scanning optical systems form light beam spots on a plurality of photosensitive elements, each corresponding to one color.

For the writing of the heterochromatic images, provided is a method is using a plurality of optical scanning devices, each corresponding to one color. However, this method is disadvantageous in that the number of components increases because optical components are provided for each color, and miniaturization is difficult because a plurality of optical scanning devices are mounted in the image forming device.

In this regard, proposed is a method of using a single optical scanning device with a plurality of scanning optical systems. In this method, generally, a plurality of light beams, each corresponding to one color, are incident onto a single optical deflector and are focused on each photosensitive element using each scanning optical system (refer to FIG. 46).

However, in this method, optical elements for each color are concentrically disposed near the optical deflector so that miniaturization of the optical scanning device is limited.

In order to overcome such a limitation in miniaturizing the optical scanning device due to the multiple colors, two methods have been proposed as follows.

As a first method, two vertically-overlapping scanning optical systems are integrated by changing polarization directions of each light beam, and the light beams are split using a polarized light beam splitting device (polarization splitting element) provided in the scanning optical system, so that each light beam is guided to one photosensitive element (herein, referred to as a "polarization splitting method").

In this method, the size of the optical scanning device is reduced in a rotation axis direction of the optical deflector (to be thinner), and optical components in the scanning optical system are shared between the vertically overlapped stages, so that the number of components is effectively reduced.

As a second method, a plurality of scanning optical systems are integrated by slightly separating optical paths of each light beam, and optical paths are separated by organizing an polarization-independent half mirror, so that each light beam is guided to one photosensitive element (herein, referred to as a polarization-independent splitting method).

In addition, other methods have been considered, including a method of integrating scanning optical systems using a dynamic active element such as a spatial modulation element or a method of splitting light beams at a dichroic mirror using light sources radiating different wavelengths. However, when the active element is used, a driving circuit is required. In addition, when the dichroic mirror is used, different types of light sources are mounted on a single optical scanning device. Therefore, even when the number of optical elements is reduced in the scanning optical system, it is necessary to further increase the number of expensive elements as a trade-off.

In this regard, the polarization splitting method described above or a polarization-independent splitting method is preferably used.

When the polarization splitting method is used, it is necessary to improve a splitting property of the polarization splitting element. For example, if the light beams incident to the polarization splitting element are slightly elliptically polarized, or polarization directions thereof are inclined, the light beams are mixed in the other scanning optical system although they are to be split from each other.

The respective light beams are radiated as different time series signals in order to write image information onto each scanning target surface. In this regard, if the polarization splitting property is not appropriate, image information to be written to other scanning target surfaces may be mixedly incorporated. For example, in the heterochromatic image forming device, information to be developed as cyan may be written to the scanning target surface for magenta. This is observed as a crosstalk between colors on the output image.

The main factor of degrading the polarization splitting property is birefringence caused when resin is used in the scanning lens. Although a resin material having a low birefringence rate is widely studied in the art, its application has some problems to be solved in consideration of the shape of the scanning lens, molding conditions, and manufacturing efficiency. Although a method of organizing the entire scanning optical system with glass lenses in order to avoid the birefringence phenomenon may be envisaged, the increasing number of lenses and poor efficiency for the resin injection molding in the glass lens manufacturing become problematic in order to keep up with the recent high image quality.

For a similar polarization-independent splitting method, the aforementioned crosstalk is generated due to a manufacturing error of a half mirror.

Japanese Patent Application Laid-open No. 63-058315 discloses a scanning optical system including a laser light source device, a focusing optical system, and a deflector. This scanning optical system is organized to reflect and deflect a light beam incident to the focusing optical system with a certain angle with respect to the optical axis of the focusing optical system by the deflector on a plane including an optical axis of the focusing optical system and a rotational axis of the deflector and scan a scanning target medium. In addition, the scanning optical system includes a light blocking means on an optical axis between the focusing optical system and the scanning target medium.

Japanese Patent Application Laid-open No. 6-003609 discloses a scanning optical device including a first optical system for modulating a light beam output from a light source, a deflection element for performing scanning in a deflective manner with the light beam output from the first optical system, and a second optical system for focusing the light beam onto the scanning target surface in a spot shape. In this scanning optical device, the part of or the entirety of the second optical system is configured as a lens molded using plastic or glass, The scanning optical device includes a light blocking member, which has a function of blocking the light beams passing through areas other than the optically effective area of the second optical system, between the deflection element and the second optical system.

Japanese Patent Application Laid-open No. 8-334719 discloses a scanning optical system including a polygonal mirror for deflecting a light beam, a housing hermetically enclosing the polygonal mirror, and a laser light source for emitting a laser light beam through a transparent parallel flat plate of the housing. In this scanning optical system, the parallel flat plate of the housing is parallel to a reflection surface of the polygonal mirror, and the laser light beam is incident in a direction inclined toward a sub-scanning direction with respect to a direction perpendicular to the reflection surface of the polygonal mirror.

Japanese Patent Application Laid-open No. 2001-305456 discloses a light scanning optical device including a light source means, a first optical system for inputting the light beam output from the light source means to a deflection means, and a second optical system for focusing the light beam deflected and reflected by the deflection means onto the scanning target surface. In this light scanning optical system, the second optical system includes at least a lens having a positioning unit in the center of the longitudinal direction of the lens and a bonding seat that does not make contact with the lens on the housing, so that the lens is fixed to the housing with use of a method of charging an adhesive into the gap between the bonding seat and the lens.

Japanese Patent Application Laid-open No. 2001-305457 discloses a light scanning optical device including a light source means, a first optical system for inputting a light beam output from the light source means to a polygonal mirror having a plurality of deflection surfaces, and a second optical system for focusing the light beam deflected and reflected by the polygonal mirror onto the effective scanning area on the scanning target surface. In this light scanning optical device, the light source means is always turned on even when the light beam scans areas other than the effective scanning area, and the polygonal mirror is provided such that a border portion between neighboring deflection surfaces is formed in an edge shape like a ridge line, and the width of the border portion spans about 1% or less of the width in the main-scanning direction of the light beam deflected and reflected by the polygonal mirror.

Japanese Patent Application Laid-open No. 2001-330790 discloses a light scanning optical device including a light source means, a first optical system for inputting the light beam output from the light source means to a deflection means, and a second optical system for focusing the light beam deflected and reflected by the deflection means onto an effective scanning area on the scanning target surface. In this light scanning optical device, the second optical system has one or more plastic lenses, and the plastic lens has a flange portion for reinforcing the end portion in the main-scanning direction, so that the corresponding area on an incidence plane and/or an emergent plane of the lens where the light beam incident to the flange portion transmits is formed in a non-mirror portion.

Japanese Patent No. 4409213 discloses a light beam scanning device in which light beams output from a light source portion are deflected at an equal angular velocity by a single deflection means, converted by a single optical means so as to scan each of a plurality of scanning targets at an equal velocity, and then, split by a splitting means so that each light beam is introduced to a plurality of scanning targets to carry out exposure scanning. In this light beam scanning device, the light source portion includes light emitting portions that generate the light beams and are at least equal in number to the number of the scanning targets. Meanwhile, a light blocking means for selectively transmitting or blocking the light beam directed to each scanning target is provided between the splitting means and each scanning target. An optical path is formed such that all of the light beams output from each light emitting portion are directed to all of the scanning targets. The splitting means is a unit for transmitting and reflecting each of the light beams so that the light beams may have the half strength, and a plurality of splitting means are provided between the deflection means and a plurality of light blocking means such that each of the light beams propagating through optical paths formed so as to correspond to scanning targets pass the optical paths the same number of times as each other, and the light beams that do not correspond to scanning targets, out of the light beams output from the respective light emitting portion, are blocked by the light blocking means.

However, the scanning optical systems disclosed in Japanese Patent Application Laid-open No. 63-058315 and Japanese Patent Application Laid-open No. 8-334719, the scanning optical device disclosed in Japanese Patent Application Laid-open No. 6-003609, and the light scanning optical devices disclosed in Japanese Patent Application Laid-open No. 2001-305456, Japanese Patent Application Laid-open No. 2001-305457, and Japanese Patent Application Laid-open No. 2001-330790 fail to take into consideration so-called ghost light included in the writing light beam modulated in response to the image information.

The light beam scanning device disclosed in Japanese Patent No. 4409213 is disadvantageous in terms of the cost because a lengthy member elongated in a main-scanning direction is necessarily used as the light blocking means. In addition, since it is necessary to arrange a plurality of splitting means over a plurality of stages in a direction perpendicular to the main-scanning direction, it is difficult to produce a thin optical scanning device. Furthermore, since four light beams are directed from the deflection means toward each scanning target on a plane perpendicular to the main-scanning direction while they are in parallel with each other, it is necessary to keep the interval of the light beams wide to some extent when it is necessary to selectively transmit or block the light beams with high accuracy with use of the light blocking means, but this leaves a concern of degradation in aberration. Moreover, this also requires highly accurate and precise installation of the light blocking means, thereby increasing the cost.

SUMMARY OF THE INVENTION

It is an object of the present invention to at least partially solve the problems in the conventional technology.

According to an aspect of the present invention, there is provided an optical scanning device that individually scans a plurality of scanning target surfaces including first and second scanning target surfaces with respective light beams. The optical scanning device includes: a light source including a first light emitting portion that outputs a first light beam and a second light emitting portion that outputs a second light beam; an optical deflector that deflects a plurality of light beams from the light source; and a scanning optical system that includes an optical splitter that splits incident light into transmitted light and reflected light and individually guides each of the first and second light beams deflected by the optical deflector to corresponding one of the scanning target surfaces. The first and second light beams are incident to the optical splitter such that principal rays of the first and second light beams are nonparallel to each other in a plane orthogonal to a main-scanning direction. The transmitted light from the optical splitter out of the first light beam is guided to the first scanning target surface, reflected light from the optical splitter out of the second light beam is guided to the second scanning target surface, and the transmitted light from the optical splitter out of the second light beam and the reflected light from the optical splitter out of the first light beam reach non of the scanning target surfaces.

According to another aspect of the present invention, there is provided an image forming device including: a plurality of image carriers including first and second image carriers; and an optical scanning device that individually scans a plurality of the image carriers using respective light beams modulated based on image information. The optical scanning device includes: a light source including a first light emitting portion that outputs a first light beam and a second light emitting portion that outputs a second light beam; an optical deflector that deflects a plurality of light beams from the light source; and a scanning optical system that includes an optical splitter that splits incident light into transmitted light and reflected light and individually guides each of the first and second light beams deflected by the optical deflector to corresponding one of the image carriers. The first and second light beams are incident to the optical splitter such that principal rays of the first and second light beams are nonparallel to each other in a plane orthogonal to a main-scanning direction. The transmitted light from the optical splitter out of the first light beam is guided to the first image carrier, reflected light from the optical splitter out of the second light beam is guided to the second image carrier, and the transmitted light from the optical splitter out of the second light beam and the reflected light from the optical splitter out of the first light beam reach non of the image carriers.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an optical scanning device a second configuration example (second);

FIGS. 34A and 34B are diagrams illustrating a modified example of the light source;

DETAILED DESCRIPTION OF THE PREFERRED EMBODIMENTS

Figure 1:
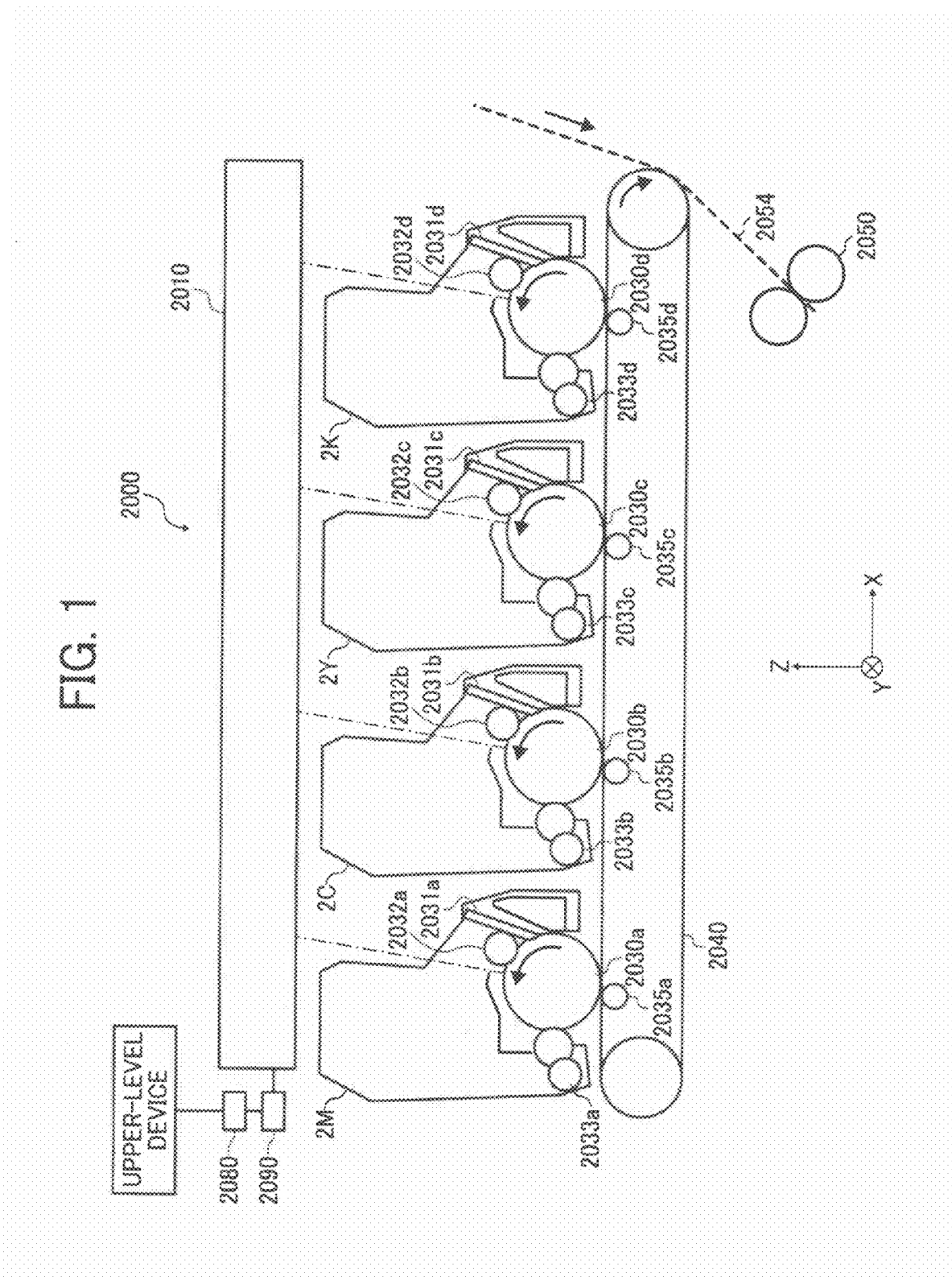
FIG. 1 is a diagram illustrating a schematic configuration of a color printer according to an embodiment of the invention.

Hereinafter, an embodiment of the invention will be described with reference to FIGS. 1 to 45. FIG. 1 illustrates a schematic configuration of a color printer 2000 as an image forming device according to an embodiment of the invention.

The color printer 2000 is a tandem type heterochromatic color printer which forms a full-color image by superimposing four colors including black, cyan, magenta, and yellow. The color printer 2000 includes an optical scanning device 2010, four photosensitive drums 2030a, 2030b, 2030c, and 2030d, four cleaning units 2031a, 2031b, 2031c, and 2031d, four roller charging devices 2032a, 2032b, 2032c, and 2032d, four developing units 2033a, 2033b, 2033c, and 2033d, four transfer rollers 2035a, 2035b, 2035c, and 2035d, an intermediate transfer belt 2040, a fixing unit 2050, a paper conveyance path 2054, a communication control unit 2080, and a printer control unit 2090 for collectively controlling each of the aforementioned elements.

Herein, in a 3-dimensional orthogonal coordinate system XYZ, the Y-axis direction denotes a longitudinal direction of each photosensitive drum, and the X-axis direction denotes an arrangement direction of four photosensitive drums.

The communication control unit 2080 controls bidirectional communication with an upper-level device (such as a PC) via a network or the like.

Each photosensitive drum is provided with a photosensitive layer on the surface thereof. That is, the surface of each photosensitive drum serves as a scanning target surface. In addition, each photosensitive drum is assumed to rotate in an arrow direction on a plane of FIG. 1 by virtue of a rotation mechanism (not shown).

A roller charging device 2032a, a developing unit 2033a, a transfer roller 2035a, and a cleaning unit 2031a are disposed along the rotation direction of the photosensitive drum 2030a in the vicinity of the photosensitive drum 2030a.

The photosensitive drum 2030a, the roller charging device 2032a, the developing unit 2033a, the transfer roller 2035a, and the cleaning unit 2031a are used as a group and constitute an image forming station for forming a magenta image (hereinafter, referred to as an M-station for simplicity purposes).

In addition, the roller charging device 2032a, the developing unit 2033a, the transfer roller 2035a, and the cleaning unit 2031a are organized as a unit, and this unit is referred to as an image forming unit 2M. The image forming unit 2M has an aperture allowing the passage of a light beam (a writing light beam) directed from the optical scanning device 2010 to the photosensitive drum 2030a.

The roller charging device 2032b, the developing unit 2033b, the transfer roller 2035b, and the cleaning unit 2031b are arranged along a rotation direction of the photosensitive drum 2030b in the vicinity of the surface of the photosensitive drum 2030b.

The photosensitive drum 2030b, the roller charging device 2032b, the developing unit 2033b, the transfer roller 2035b, and the cleaning unit 2031b are used as a group and constitute an image forming station for forming a cyan image (hereinafter, referred to as a C-station for simplicity purposes).

In addition, the roller charging device 2032b, the developing unit 2033b, the transfer roller 2035b, and the cleaning unit 2031b are organized as a unit, and this unit is referred to as an image forming unit 2C. The image forming unit 2C includes an aperture allowing the passage of a light beam (a writing light beam) directed from the optical scanning device 2010 to the photosensitive drum 2030b.

The roller charging device 2032c, the developing unit 2033c, the transfer roller 2035c, and the cleaning unit 2031c are arranged along a rotation direction of the photosensitive drum 2030c in the vicinity of the surface of the photosensitive drum 2030c.

The photosensitive drum 2030c, the roller charging device 2032c, the developing unit 2033c, the transfer roller 2035c, and the cleaning unit 2031c are used as a group and constitute an image forming station for forming a yellow image (hereinafter, referred to as a Y-station for simplicity purposes).

In addition, the roller charging device 2032c, the developing unit 2033c, the transfer roller 2035c, and the cleaning unit 2031c are organized as a unit, and this unit is referred to as an image forming unit 2Y. The image forming unit 2Y has an aperture allowing the passage of a light beam (a writing light beam) directed from the optical scanning device 2010 to the photosensitive drum 2030c.

The roller charging device 2032d, the developing unit 2033d, the transfer roller 2035d, and the cleaning unit 2031d are arranged along the rotation direction of the photosensitive drum 2030d in the vicinity of the surface of the photosensitive drum 2030d.

The photosensitive drum 2030d, the roller charging device 2032d, the developing unit 2033d, the transfer roller 2035d, and the cleaning unit 2031d are used as a group and constitute an image forming station for forming a black image (hereinafter, referred to as a K-station for simplicity purposes).

In addition, the roller charging device 2032d, the developing unit 2033d, the transfer roller 2035d, and the cleaning unit 2031d are organized as a unit, and this unit is referred to as an image forming unit 2K. The image forming unit 2K has an aperture allowing the passage of a light beam (a writing light beam) directed from the optical scanning device 2010 to the photosensitive drum 2030d.

Each roller charging device uniformly conducts electricity on the surface of the corresponding photosensitive drum.

The optical scanning device 2010 irradiates the light beams modulated for each color onto the surface of the corresponding conducted photosensitive drum based on the image information of multiple colors (including black image information, magenta image information, cyan image information, and yellow image information) from an upper-level device. As a result, electric charges are lost in a portion where light is irradiated on the surface of each photosensitive drum, and a latent image corresponding to the image information is formed on the surface of each photosensitive drum. Here, the formed latent image is moved to the corresponding developing unit while the photosensitive drum is rotated. The configuration of the optical scanning device 2010 will be described below.

Each developing unit attaches a toner to the latent image formed on the surface of the photosensitive drum to develop the latent image. Here, the image (a so-called toner image) obtained by attaching the toner is moved to the intermediate transfer belt 2040 while the photosensitive drum rotates.

Each transfer roller transfers the toner image formed on the surface of the corresponding photosensitive drum to the intermediate transfer belt 2040. In addition, the black, magenta, cyan, and yellow toner images are superimposed on the intermediate transfer belt 2040.

The printer control unit 2090 performs control such that the recording sheet stored in a paper cassette (not shown) is sent to the intermediate transfer belt 2040 over the paper conveyance path 2054 at a predetermined timing. As a result, the toner image on the intermediate transfer belt 2040 is transferred to the recording sheet. Here, the transferred recording sheet is sent to the fixing unit 2050.

The fixing unit 2050 applies heat and pressure to the recording sheet so that the toner is fixed onto the recording sheet. Here, the toner-fixed recording sheets are sequentially stacked in a discharge tray (not shown).

Each cleaning unit removes toner (toner remnants) remaining on the surface of the corresponding photosensitive drum. The surface of the photosensitive drum where the toner remnants are removed is returned to the position facing the corresponding charging unit again.

Next, the configuration of the optical scanning device 2010 will be described. The configuration of the optical scanning device 2010 may be contemplated in diverse ways. In this regard, several configuration examples will be described. Hereinafter, a direction corresponding to the main-scanning direction is referred to as a "main-scanning matching direction," and a direction corresponding to the sub-scanning direction is referred to as a "sub-scanning matching direction" for simplicity purposes.

First Configuration Example

Figure 2:
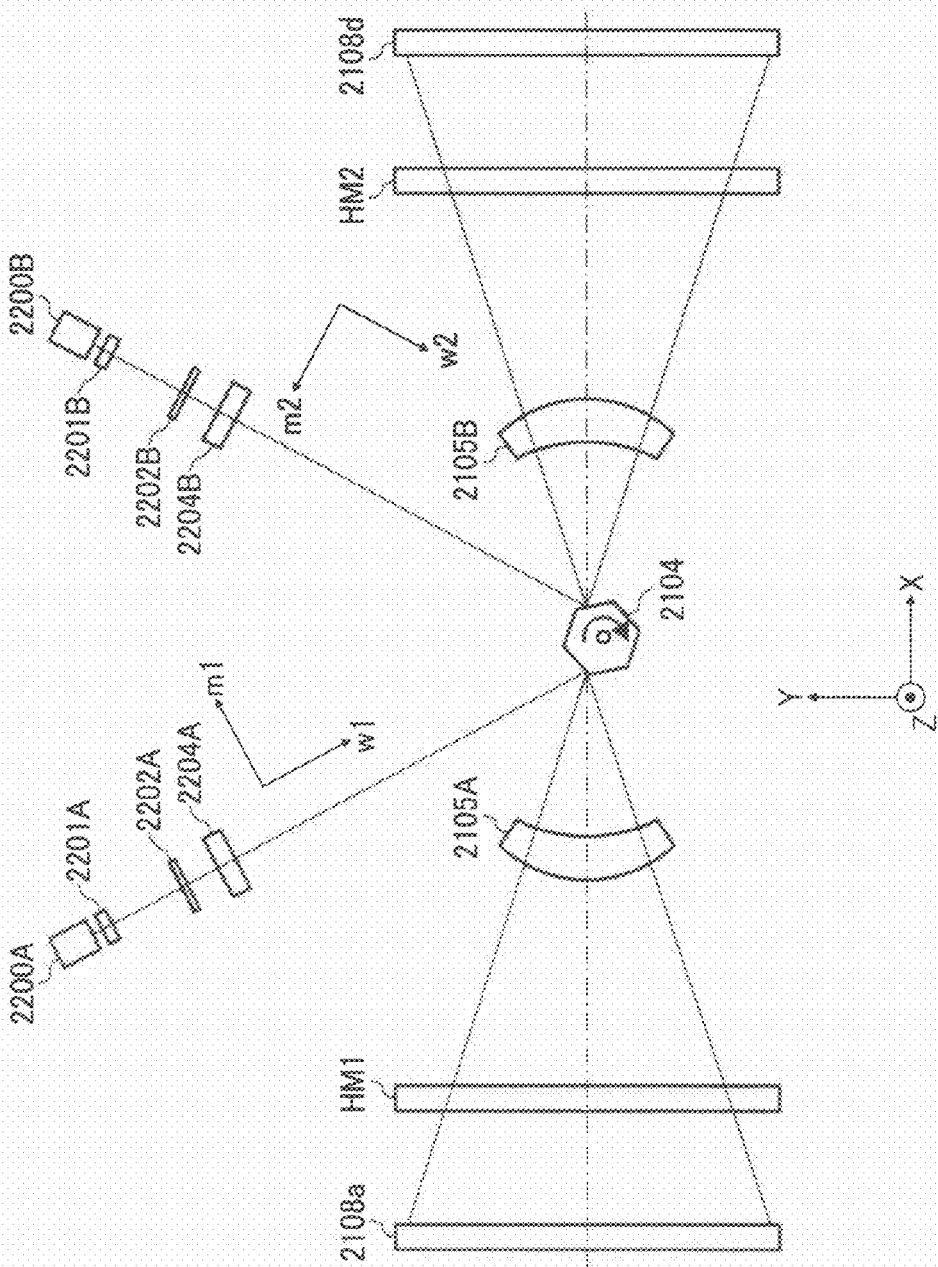
FIG. 2 is a diagram illustrating an optical scanning device according to a first configuration example (first)

As shown in FIGS. 2 and 3, the optical scanning device 2010 in the first configuration example includes two light sources 2200A and 2200B, two coupling lenses 2201A and 2201B, two aperture plates 2202A and 2202B, two collimating lenses 2204A and 2204B, an optical deflector 2104, two scanning lenses 2105A and 2105B, two half mirrors HM1 and HM2, eight steering mirrors 2108a, 2108b, 2108c, 2108d, 2109a, 2109b, 2109c, and 2109d, and a scanning control device (not shown). These elements may be installed at predetermined positions in an optical housing (not shown).

Here, a light beam output direction of the light source 2200A is referred to as a "w1 direction," and a main-scanning matching direction in the light source 2200A is referred to as an "m1 direction." Similarly, a light beam output direction of the light source 2200B is referred to as a "w2 direction," and the main-scanning matching direction of the light source 2200B is referred to as an "m2 direction." In addition, the sub-scanning matching directions in each light source are equally set to the Z-axis direction.

Figure 4A:
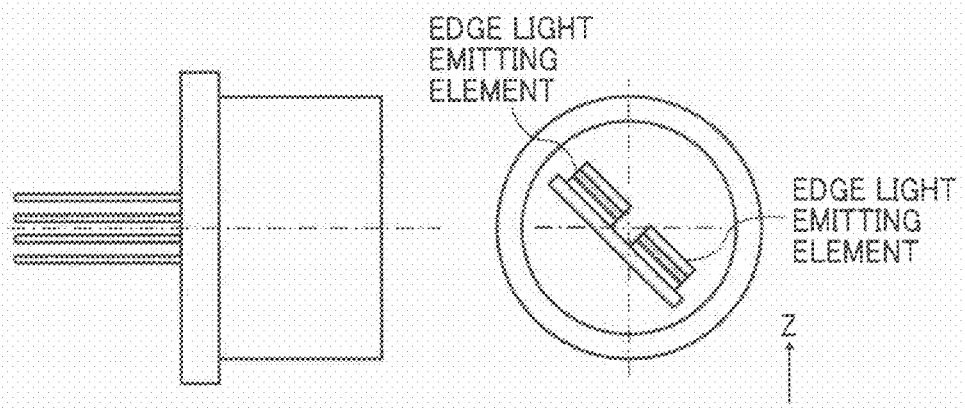
FIGS. 4A and 4B are diagrams, each illustrating a light source.
Figure 4B:
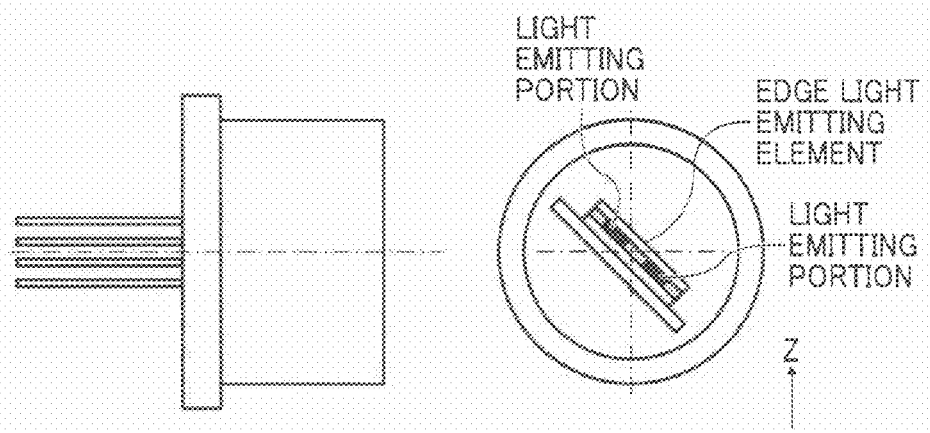

As shown in FIG. 4A, for example, each light source has a semiconductor laser obtained by packaging two edge light emitting elements with a metal or the like. The edge light emitting element typically has a double heterojunction structure obtained by bonding a p-type semiconductor material and an n-type semiconductor material. As an electric current is injected into the bonding portion thereof, a laser light beam is output from an active layer provided in the bonding portion. In addition, for example, a single edge light emitting element having two light emitting portions may be used instead of two edge light emitting elements as shown in FIG. 4B.

Figure 5A:
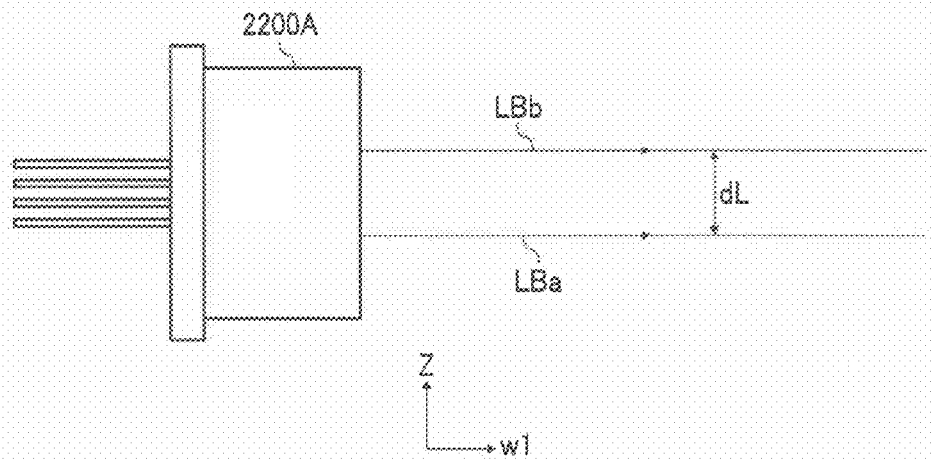
FIGS. 5A and 5B are diagrams, each illustrating light beams output from each light source.
Figure 5B:
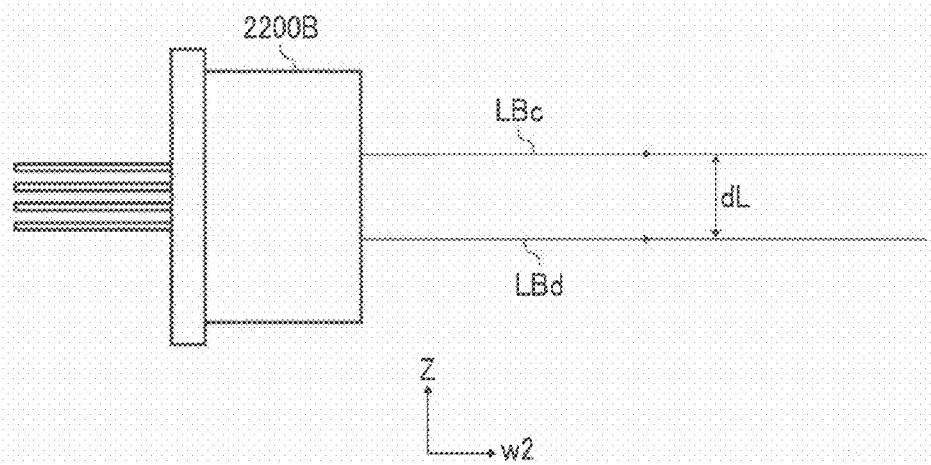

Each light source is arranged such that two output light beams are separated from each other with respect to the Z-axis direction by a gap dL (for example, set to 0.1 mm) as shown in FIGS. 5A and 5B.

Hereinafter, for simplicity purposes, the reference symbol LBa denotes the light beam directed to the −Z direction out of the two light beams output from the light source 2200A, and the reference symbol LBb denotes the light beam directed to the +Z direction. In addition, the reference symbol LBc denotes the light beam directed to the +Z direction out of the two light beams output from the light source 2200B, and the reference symbol LBd denotes the light beam directed to the −Z direction.

Returning to FIG. 2, the coupling lens 2201A is disposed on the +w1 side of the light source 2200A and couples the two light beams output from the light source 2200A to a subsequent optical system in any one of states of collimated light, convergent light, and divergent light.

The coupling lens 2201B is disposed on the +w2 side of the light source 2200B and couples the two light beams output from the light source 2200B to a subsequent optical system in any one of states of collimated light, convergent light, and divergent light.

The aperture plate 2202A has an aperture, and shapes the light beam through the coupling lens 2201A.

The aperture plate 2202B has an aperture, and shapes the light beam through the coupling lens 2201B.

The collimating lens 2204A focuses the light beam transmitting through the aperture of the aperture plate 2202A in the vicinity of the deflective reflection surface of the optical deflector 2104 with respect to the Z-axis direction.

The collimating lens 2204B focuses the light beam transmitting through the aperture of the aperture plate 2202B in the vicinity of the deflective reflection surface of the optical deflector 2104 with respect to the Z-axis direction.

Figure 6:
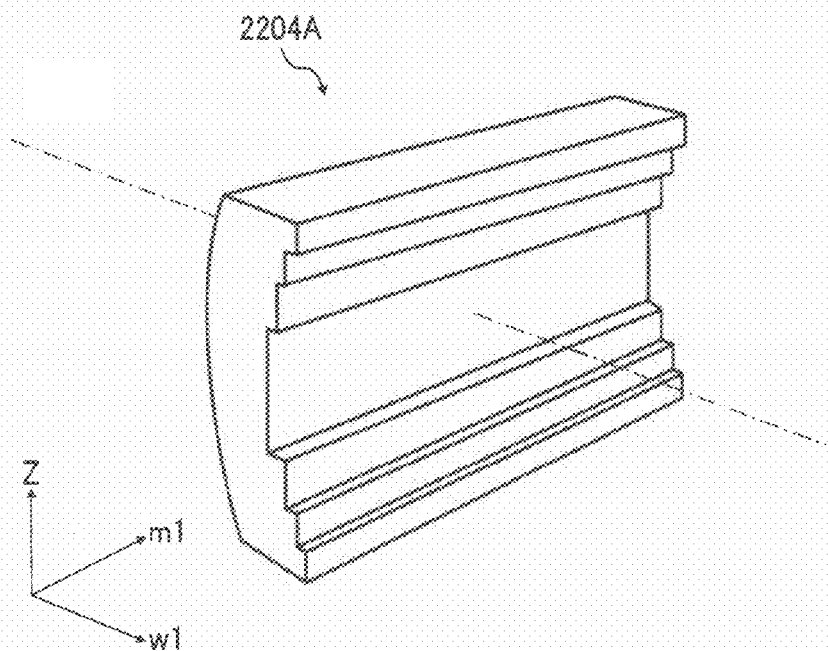
FIG. 6 is a diagram illustrating a diffraction lens.
Figure 7:
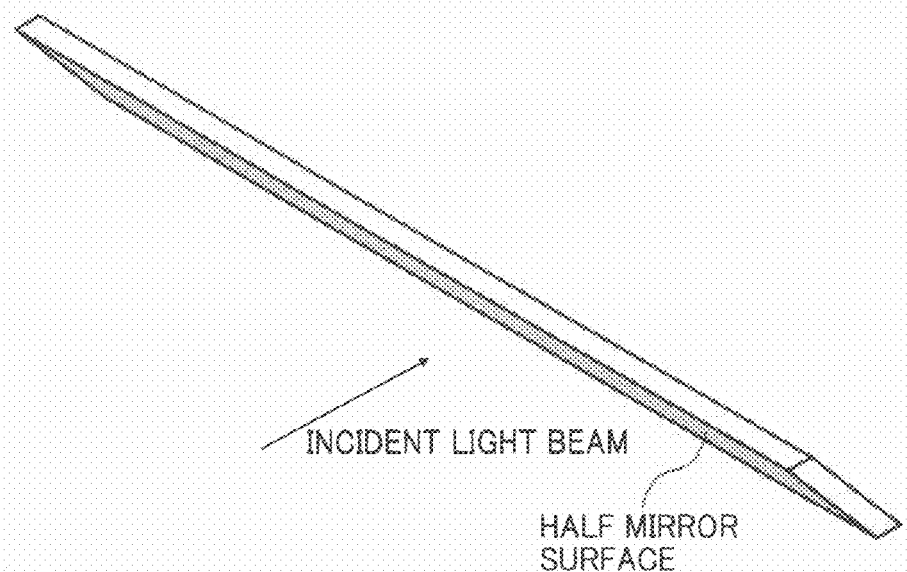
FIG. 7 is a diagram illustrating an exemplary half mirror.

Here, a diffraction lens having a cylindrical surface on the incident surface and having a diffractive surface on the output surface is used as the collimating lens (refer to FIG. 6). The diffraction lens has a function of correcting a focus deviation on the surface of the photosensitive drum caused by a strong negative dispersion characteristic of the diffractive surface when the temperature of the optical scanning device is changed by varying the wavelength of the light source. In addition, when consideration of the temperature correction is not needed, a cylindrical lens may be used in each of the collimating lens.

The optical system disposed on the optical path between the light source and the optical deflector 2104 is called a pre-deflector optical system. In the first configuration example, the pre-deflector optical system includes two coupling lens 2201A and 2201B, two aperture plates 2202A and 2202B, and two collimating lenses 2204A and 2204B.

The optical deflector 2104 has a single-stage 6-faceted mirror (polygonal mirror), and each mirror serves as a deflective reflection surface.

Here, the light beams LBa and LBb from the cylindrical lens 2204A are deflected to the −X side of the optical deflector 2104, and the light beams LBc and LBd from the cylindrical lens 2204B are deflected to the +X side of the optical deflector 2104.

The scanning lens 2105A is disposed on the −X side of the optical deflector 2104, and the scanning lens 2105B is disposed on the +X side of the optical deflector 2104. Each scanning lens is formed of resin.

The focal lengths of each scanning lens are set such that the deflective reflection surface of the optical deflector 2104 and the scanning target surface of the corresponding photosensitive drum are approximately conjugated with each other. In addition, a so-called "surface inclination correction function" is provided such that a focus position is not influenced even when the deflective reflection surface of the optical deflector 2104 is slanted (inclined) with respect to the Z-axis direction due to a manufacturing error. Furthermore, each scanning lens may include a plurality of lenses. In this case, a glass lens may be used.

The half mirror HM1 is disposed in the −X side of the scanning lens 2105A, and the half mirror HM2 is disposed in the +X side of the scanning lens 2105B. It is not necessary that transmittance and reflectivity of each half mirror are strictly 50%. The ratio therebetween may change depending on a desired optical characteristic.

Figure 8:
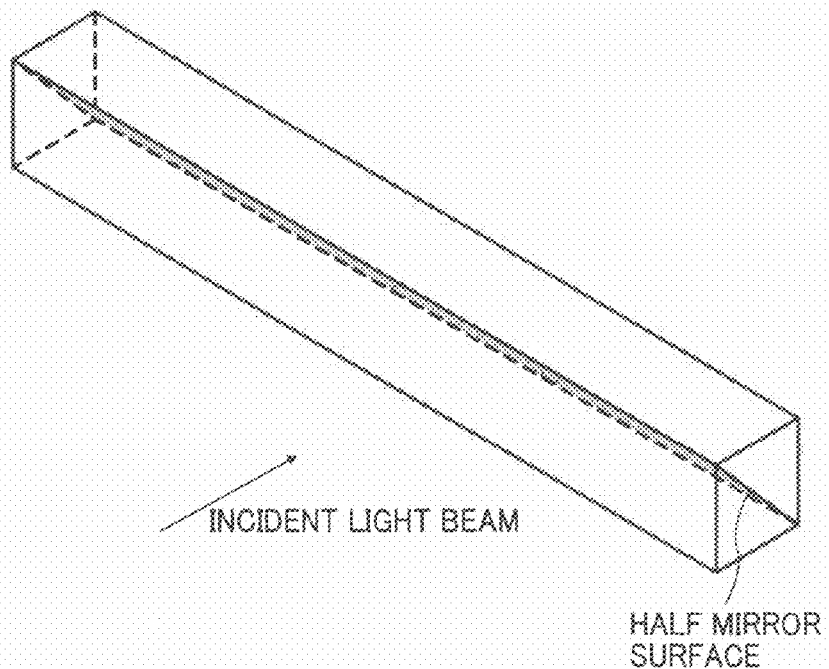
FIG. 8 is a diagram illustrating another exemplary half mirror.

Each half mirror may be manufactured by depositing multiple films made of glass or resin in a parallel plate shape (refer to FIG. 7), or by bonding two triangular column prisms to each other at a light beam splitting surface (refer to FIG. 8).

Returning to FIG. 3, the light beams LBa and LBb deflected in the −X direction at the optical deflector 2104 are incident to the half mirror HM1 through the scanning lens 2105A.

The light beams LBa and LBb incident to the half mirror HM1 are split into a light beam transmitting through the half mirror HM1 and a light beam reflected by the half mirror HM1.

The steering mirrors 2108a and 2109a are arranged such that the light beam LBa transmitting through the half mirror HM1 is guided to the photosensitive drum 2030a.

The steering mirrors 2108b and 2109b are arranged such that the light beam LBb reflected by the half mirror HM1 is guided to the photosensitive drum 2030b.

In this regard, the light beam LBa transmitting through the half mirror HM1 is irradiated onto the photosensitive drum 2030a via the steering mirrors 2108a and 2109a to form a light spot. This light spot moves in a longitudinal direction of the photosensitive drum 2030a as the optical deflector 2104 is rotated. That is, it scans the photosensitive drum 2030a. The movement direction of the light spot at this time is a "main-scanning direction" of the photosensitive drum 2030a, and the rotation direction of the photosensitive drum 2030a is a "sub-scanning direction" of the photosensitive drum 2030a.

The light beam LBb reflected by the half mirror HM1 is irradiated onto the photosensitive drum 2030b via the steering mirrors 2108b and 2109b to form a light spot. This light spot moves in a longitudinal direction of the photosensitive drum 2030b as the optical deflector 2104 is rotated. That is, it scans the photosensitive drum 2030b. The movement direction of the light spot at this time is a "main-scanning direction" of the photosensitive drum 2030b, and the rotation direction of the photosensitive drum 2030b is a "sub-scanning direction" of the photosensitive drum 2030b.

The light beams LBc and LBd deflected by the optical deflector 2104 in the +X direction are incident to the half mirror HM2 through the scanning lens 2105B.

The light beams LBc and LBd incident to the half mirror HM2 are split into the light beam transmitting through the half mirror HM2 and the light beam reflected by the half mirror HM2.

The steering mirrors 2108c and 2109c are arranged such that light beam reflected by the half mirror HM2 is guided to the photosensitive drum 2030c.

The steering mirrors 2108d and 2109d are arranged such that the light beam transmitting through the half mirror HM2 is guided to the photosensitive drum 2030d.

In this regard, the light beam LBc reflected by the half mirror HM2 is irradiated onto the photosensitive drum 2030c via the steering mirrors 2108c and 2109c to form a light spot. This light spot moves in a longitudinal direction of the photosensitive drum 2030c as the optical deflector 2104 is rotated. That is, it scans the photosensitive drum 2030c. The movement direction of the light spot at this time is a "main-scanning direction" of the photosensitive drum 2030c, and the rotation direction of the photosensitive drum 2030c is a "sub-scanning direction" of the photosensitive drum 2030c.

In addition, the light beam LBd transmitting through the half mirror HM2 is irradiated onto the photosensitive drum 2030d via the steering mirrors 2108d and 2109d to form a light spot. This light spot moves in a longitudinal direction of the photosensitive drum 2030d as the optical deflector 2104 is rotated. That is, it scans the photosensitive drum 2030d. The movement direction of the light spot at this time is a "main-scanning direction" of the photosensitive drum 2030d, and the rotation direction of the photosensitive drum 2030c is a "sub-scanning direction" of the photosensitive drum 2030d.

The optical system arranged on an optical path between the optical deflector 2104 and the photosensitive drum is called a scanning optical system. In this first configuration example, the scanning lens 2105A, the half mirror HM1, the steering mirror 2108a, and the steering mirror 2109a constitute a scanning optical system of the M-station, and the scanning lens 2105A, the half mirror HM1, the steering mirror 2108b, and the steering mirror 2109b constitute a scanning optical system of the C-station. That is, the scanning lens 2105A is shared by two image forming stations.

In addition, the scanning lens 2105B, the half mirror HM2, the steering mirror 2108c, and the steering mirror 2109c constitute a scanning optical system of the Y-station, and the scanning lens 2105B, the half mirror HM2, the steering mirror 2108d, and the steering mirror 2109d constitute a scanning optical system of the K-station. That is, the scanning lens 2105B is shared by two image forming stations.

The steering mirrors 2108a and 2109a constitute a light guiding optical system in the scanning optical system of the M-station, and the steering mirrors 2108b and 2109b constitute a light guiding optical system in the scanning optical system of the C-station.

The steering mirrors 2108c and 2109c constitute a light guiding optical system in the scanning optical system of the Y-station, and the steering mirrors 2108d and 2109d constitute a light guiding optical system in the scanning optical system of the K-station.

Each steering mirror is a long mirror member extending in the Y-axis direction as a longitudinal direction, and is notched in order to prevent interference with a light beam transmitting through the +Z side or the wall surface of the optical housing.

That is, the cross section orthogonal to the main-scanning direction has a trapezoidal shape.

Figure 9:
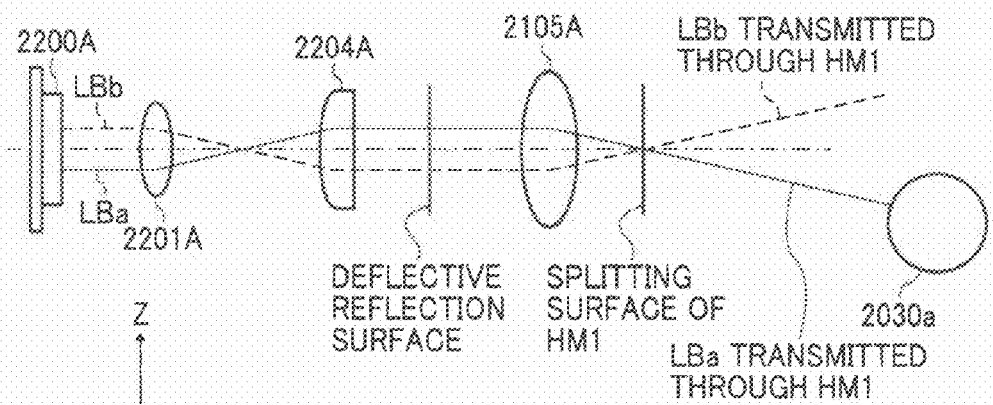
FIG. 9 is a schematic diagram illustrating optical paths of two light beams LBa and LBb output from a light source 2200A (first)
Figure 10:
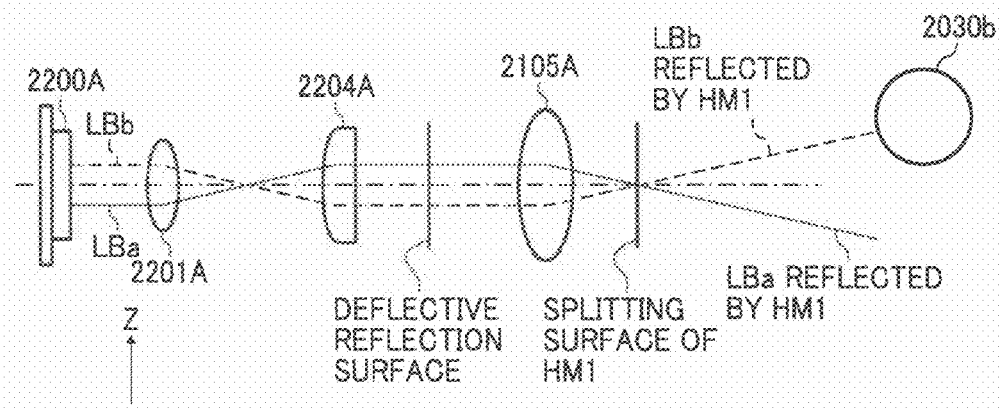
FIG. 10 is a schematic diagram illustrating optical paths of two light beams LBa and LBb output from the light source 2200A (second)
Figure 11:
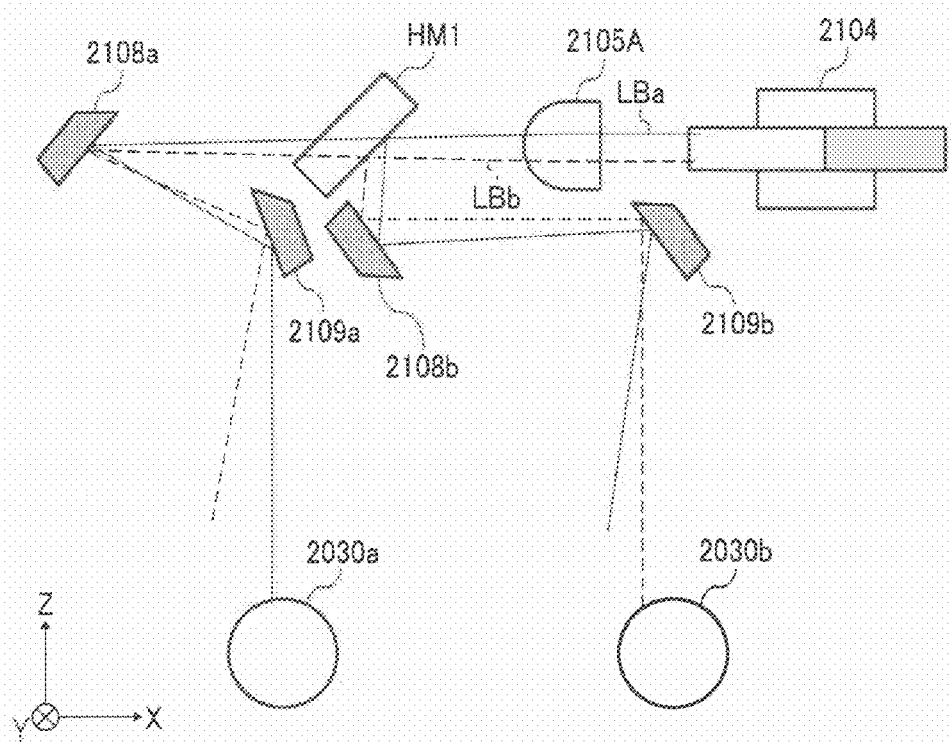
FIG. 11 is a diagram illustrating optical paths of two light beams LBa and LBb polarized by an optical deflector.

FIGS. 9 and 10 schematically illustrate the optical paths of the light beams LBa and LBb.

FIG. 9 illustrates optical paths of the light beams LBa and LBb output from the light source 2200A and transmitting through the half mirror HM1. In addition, FIG. 10 illustrates optical paths of the light beams LBa and LBb output from the light source 2200A and reflected by the half mirror HM1.

Here, the interval between the coupling lens 2201A and the collimating lens 2204A is approximated to the sum of the focal lengths of the coupling lens 2201A and the collimating lens 2204A so that the light beams LBa and LBb are output approximately in parallel to each other from the collimating lens 2204A. In addition, the light beams LBa and LBb are incident to the half mirror HM1 such that principal rays thereof are in a nonparallel state to each other in the surface orthogonal to the main-scanning direction.

The light beam LBb transmitting through the half mirror HM1 is gradually separated from the light beam LBa transmitting through the half mirror HM1 as the light beam LBa transmitting through the half mirror HM1 approaches the photosensitive drum 2030a. As a result, it is possible to prevent a crosstalk in the photosensitive drum 2030a (refer to FIG. 11).

In addition, the light beam LBa reflected by the half mirror HM1 is gradually separated from the light beam LBb reflected by the half mirror HM1 as the light beam LBb reflected by the half mirror HM1 approaches the photosensitive drum 2030b. As a result, it is possible to prevent a crosstalk in the photosensitive drum 2030b (refer to FIG. 11).

Figure 12:
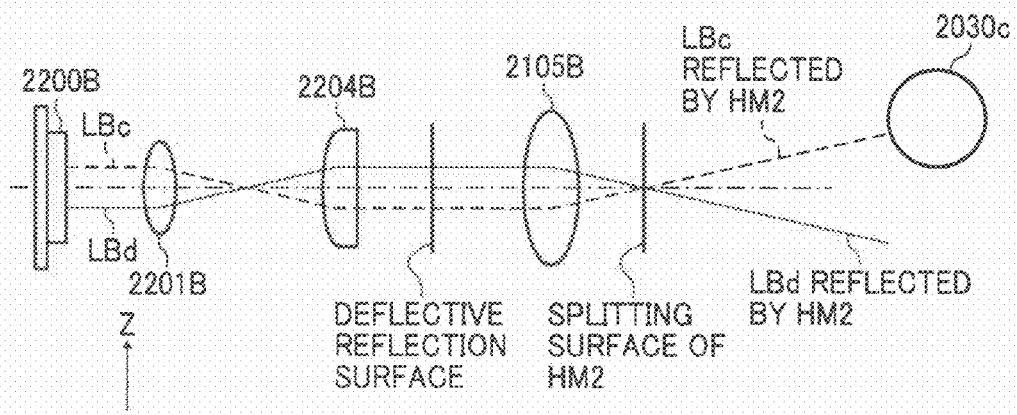
FIG. 12 is a schematic diagram illustrating optical paths of two light beams LBc and LBd output from a light source 2200B (first)
Figure 13:
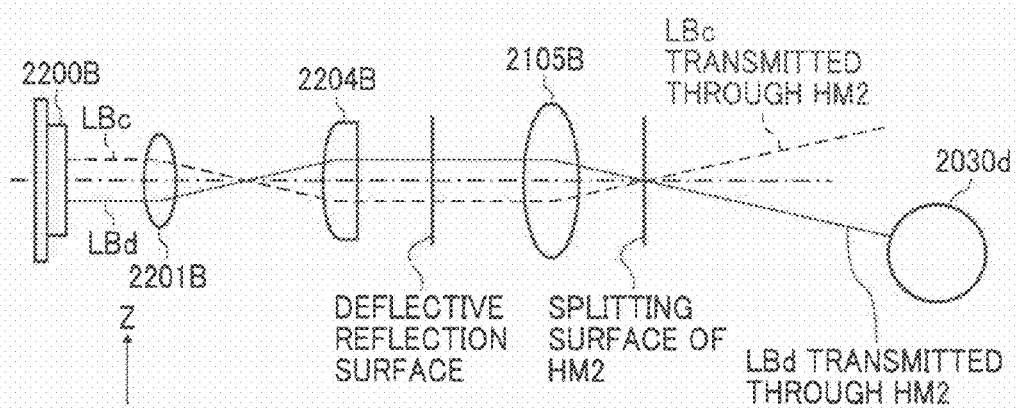
FIG. 13 is a schematic diagram illustrating optical paths of two light beams LBc and LBd output from the light source 2200B (second)

FIGS. 12 and 13 schematically illustrate the optical paths of the light beams LBc and LBd.

FIG. 12 illustrates optical paths of the light beams LBc and LBd output from the light source 2200B and reflected by the half mirror HM2. In addition, FIG. 13 illustrates optical paths of the light beams LBc and LBd output from the light source 2200B and transmitting through the half mirror HM2.

Here, the interval between the coupling lens 2201B and the collimating lens 2204B is approximated to the sum of the focal lengths of the coupling lens 2201B and the collimating lens 2204B so that the light beams LBc and LBd are output approximately in parallel from the collimating lens 2204B. In addition, the light beams LBc and LBd are incident to the half mirror HM2 such that principal rays thereof are in a nonparallel state to each other in the surface orthogonal to the main-scanning direction.

The light beam LBd reflected by the half mirror HM2 is gradually separated from the light beam LBc reflected by the half mirror HM2 as the light beam LBc reflected by the half mirror HM2 approaches the photosensitive drum 2030c. As a result, it is possible to prevent a crosstalk in the photosensitive drum 2030c (refer to FIG. 14).

In addition, the light beam LBc transmitting through the half mirror HM2 is gradually separated from the light beam LBd transmitting through the half mirror HM2 as the light beam LBd transmitting through the half mirror HM2 approaches the photosensitive drum 2030d. As a result, it is possible to prevent a crosstalk in the photosensitive drum 2030d (refer to FIG. 14).

The interval between the two light beams LBa and LBb transmitting through the half mirror HM1 with respect to the sub-scanning matching direction in the vicinity of the photosensitive drum 2030a and the interval between the two light beams LBa and LBb reflected by the half mirror HM1 with respect to the main-scanning matching direction in the vicinity of the photosensitive drum 2030b are determined by the interval between the two light emitting portions of the light source 2200A with respect to the sub-scanning matching direction and the lateral magnification of the optical system. Hereinafter, for simplicity purposes, the interval between the two light beams transmitting through the half mirror and the two light beams reflected by the half mirror with respect to the sub-scanning matching direction is referred to as a "separation interval." In addition, the interval between the two light emitting portions of the light source with respect to the sub-scanning matching direction is referred to as a "light emitting portion interval."

On the other hand, if the light emitting portion interval is set to a too large value, the separation interval becomes large, so as to be advantageous in prevention of a crosstalk. Meanwhile, since incident positions of the light beams LBa and LBb on the incident surface of the scanning lens are different in the sub-scanning matching direction, aberration is degraded. However, in the first configuration example of the invention, the optical system between the optical deflector 2104 and the photosensitive drum is a magnification system in the sub-scanning matching direction (the lateral magnification is larger than 1). Therefore, the separation interval of the corresponding photosensitive drum can be set to an interval sufficient to prevent a crosstalk without increasing the light emitting portion interval of the light source 2200A so large as to generate degradation in aberration.

Similarly, for the two light beams LBc and LBd reflected by the half mirror HM2 and the two light beams LBc and LBd transmitting through the half mirror HM2, the separation interval of the corresponding photosensitive drums can be set to a value sufficient to prevent a crosstalk without increasing the light emitting portion interval of the light source 2200S so large as to generate degradation in aberration.

Figures 14, 15:
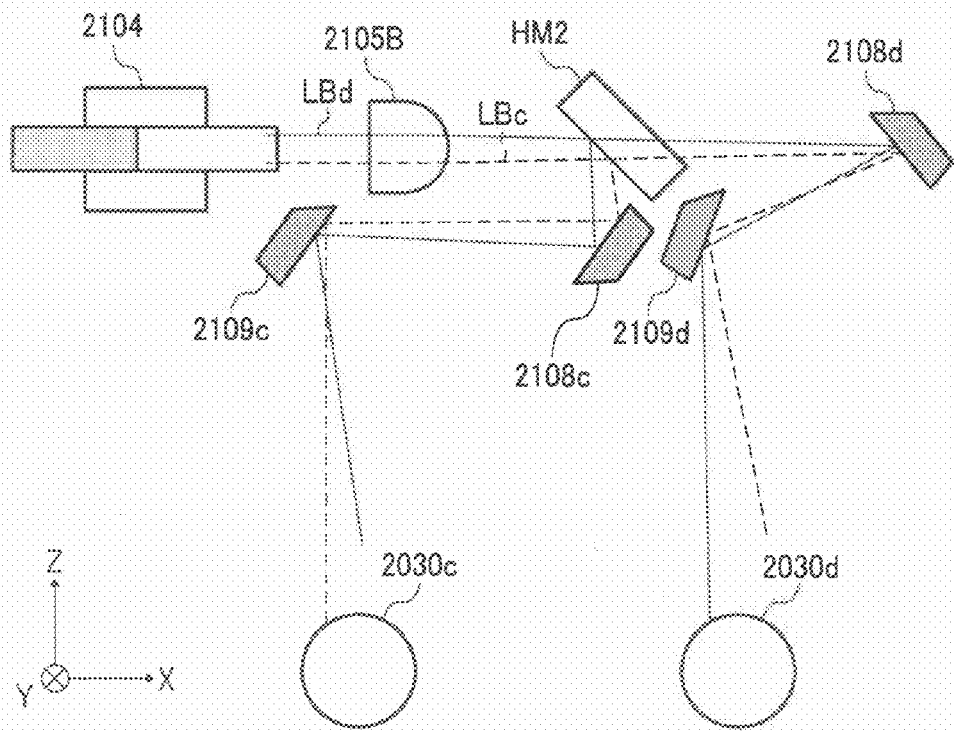
FIG. 14 is a diagram illustrating optical paths of two light beams LBc and LBd deflected by the optical deflector.
FIG. 15 is a diagram illustrating an example of each design value in a pre-deflector optical system.
Figures 16, 17:
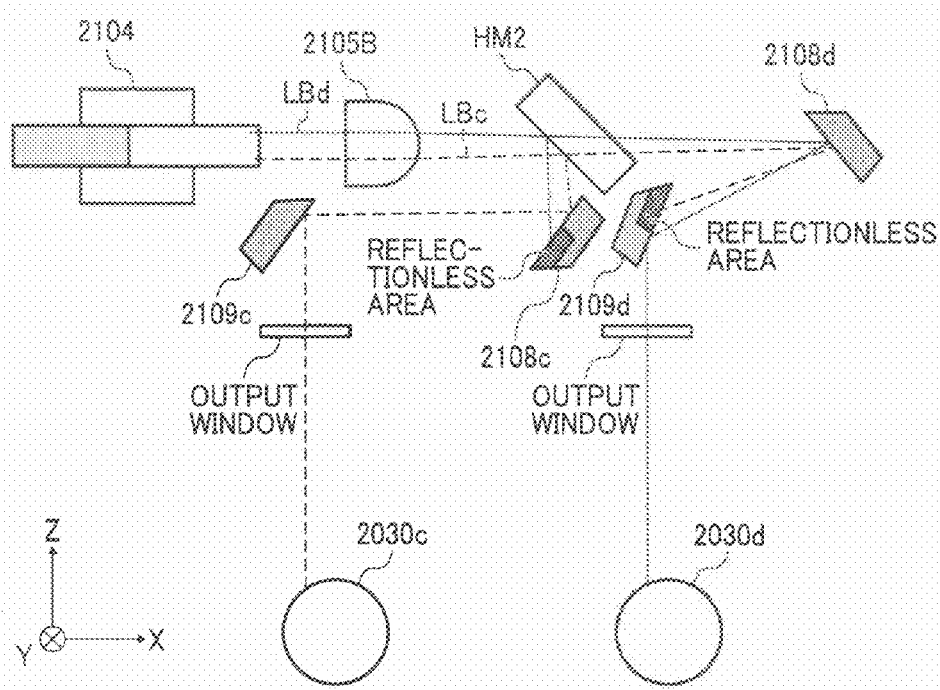
FIG. 16 is a diagram illustrating an example of each design value in a scanning optical system.
FIG. 17 is a diagram illustrating a first light blocking method.
Figure 18:
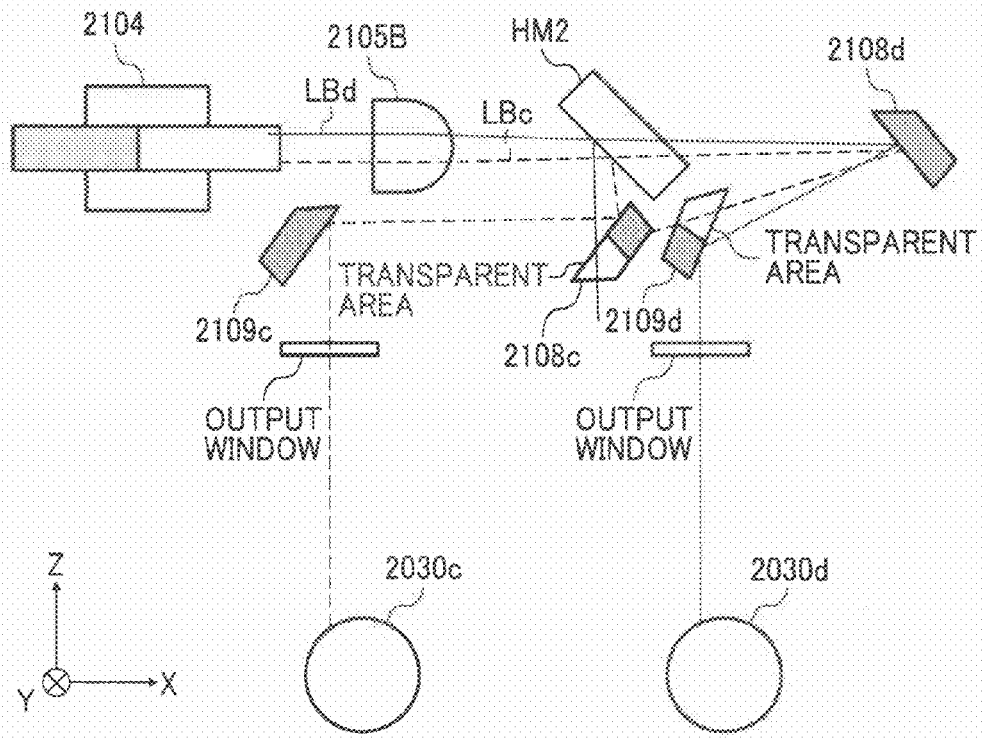
FIG. 18 is a diagram illustrating a second light blocking method.
Figure 19:
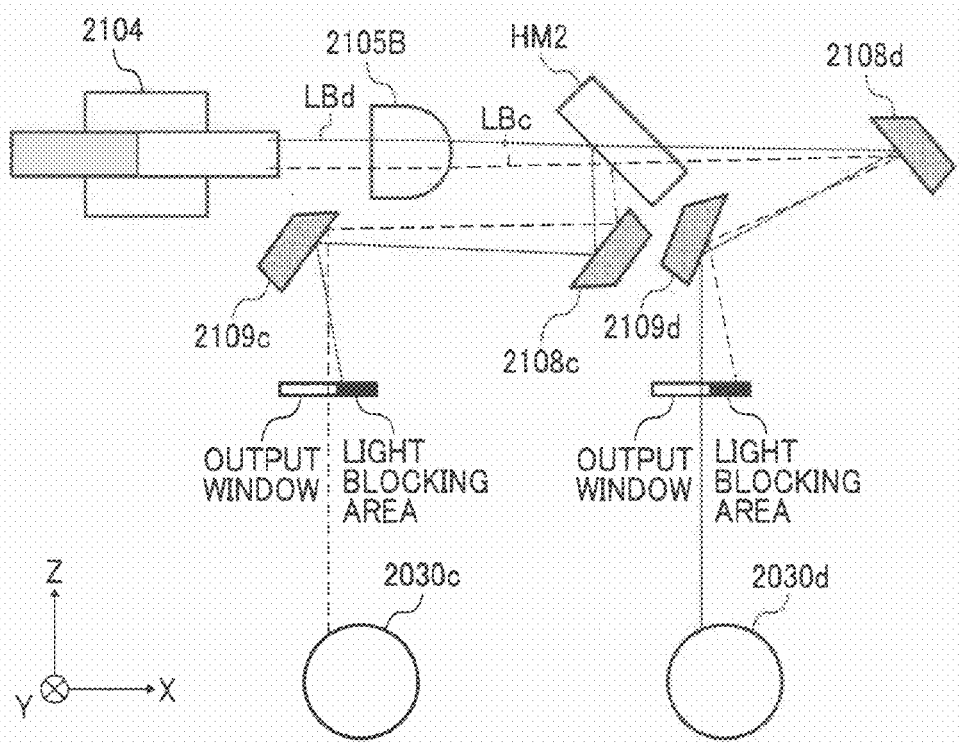
FIG. 19 is a diagram illustrating a third light blocking method.
Figure 20:
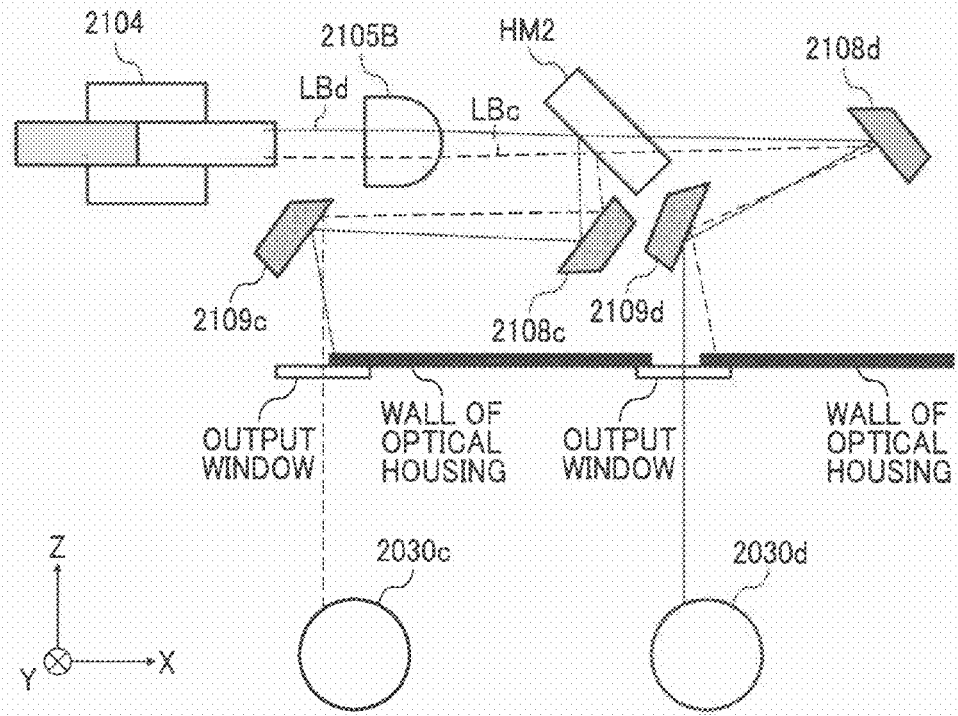
FIG. 20 is a diagram illustrating a fourth light blocking method.

FIG. 15 illustrates an example of design values of the pre-polarizer optical system, and FIG. 16 illustrates an example of design values of the scanning optical system. Here, the reference symbol RY denotes a radius of curvature in the main-scanning matching direction, and the reference symbol RZ denotes a radius of curvature in the sub-scanning matching direction. In this case, when the light emitting portion interval of the light source is 0.1 mm, the separation interval in the vicinity of the photosensitive drum becomes about 2.5 mm.

In this case, the two light beams are incident to a position eccentric from the generating line of the scanning lens while they are separated about 1.4 mm with respect to the sub-scanning matching direction on the incident surface of the scanning lens. However, the two light beams have a field curvature variation of 0.2 mm and a linearity variation of 1% or less in comparison with the light beam transmitting through the generating line of the scanning lens. Therefore, the two light beams output from the light source or the like and transmitting through the half mirror and the two light beams reflected by the half mirror can be separated in the vicinity of the photosensitive drum without degrading aberration.

On the other hand, when an unnecessary light beam (hereinafter, referred to as undesired light for simplicity purposes) is incident to the light guiding optical system, it is possible to perfectly prevent a crosstalk in the photosensitive drum by blocking the light between the half mirror and the photosensitive drum. Hereinafter, some methods of blocking undesired light will be described.

In this case, undesired light includes the light beam LBb transmitting through the half mirror HM1, the light beam LBa reflected by the half mirror HM1, the light beam LBd reflected by the half mirror HM2, and the light beam transmitting through the half mirror HM2. Hereinafter, for simplicity purposes, the light beam LBd reflected by the half mirror HM2 is also referred to as an "undesired light beam LBd," and the light beam LBc transmitting through the half mirror HM2 is also referred to as an "undesired light beam LBc."

In a first light blocking method, the area where undesired light is incident on the reflection surface of the steering mirror is set to a nonreflecting area (optical absorption area). For example, it is possible to prevent the undesired light beam LBd from being directed to the steering mirror 2109c by setting the area where the undesired light beam LBd is incident on the reflection surface of the steering mirror 2108c as a nonreflecting area (refer to FIG. 17). In addition, it is possible to prevent the undesired light beam LBc from being directed to the output window by setting the area where the undesired light beam LBc is incident on the reflection surface of the steering mirror 2109d as a nonreflecting area (refer to FIG. 17).

In a second light blocking method, the area where undesired light is incident on the reflection surface of the steering mirror is set as a transparent area. For example, it is possible to prevent the undesired light beam LBd from being directed to the steering mirror 2109c by setting the area where the undesired light beam LBd is incident on the reflection surface of the steering mirror 2108c as a transparent area (refer to FIG. 18). In addition, it is possible to prevent the undesired light beam LBc from being directed to the output window by setting the area where the undesired light beam LBc is incident on the reflection surface of the steering mirror 2109d as a transparent area (refer to FIG. 18).

In a third light blocking method, a light blocking member is coated or arranged in the area where undesired light is incident on the output window as a mask so that the corresponding area serves as a light blocking area. For example, it is possible to prevent the undesired light beam LBd from being output from the output window by setting the area where the undesired light beam LBd is incident on the output window as a light blocking area (refer to FIG. 19). In addition, it is possible to prevent the undesired light beam LBc from being output from the output window by setting the area where the undesired light beam LBc is incident on the output window as a light blocking area (refer to FIG. 19).

In a fourth light blocking method, the area where undesired light is incident on the output window is set as a light blocking area by virtue of a wall of the optical housing. For example, it is possible to prevent the undesired light beam LBd from being output from the output window by setting the area where the undesired light beam LBd is incident on the output window as a light blocking area using a wall of the optical housing (refer to FIG. 20). In addition, it is possible to prevent the undesired light beam LBc from being output from the output window by setting the area where the undesired light beam LBc is incident on the output window as a light blocking area using a wall of the optical housing (refer to FIG. 20).

Figure 21:
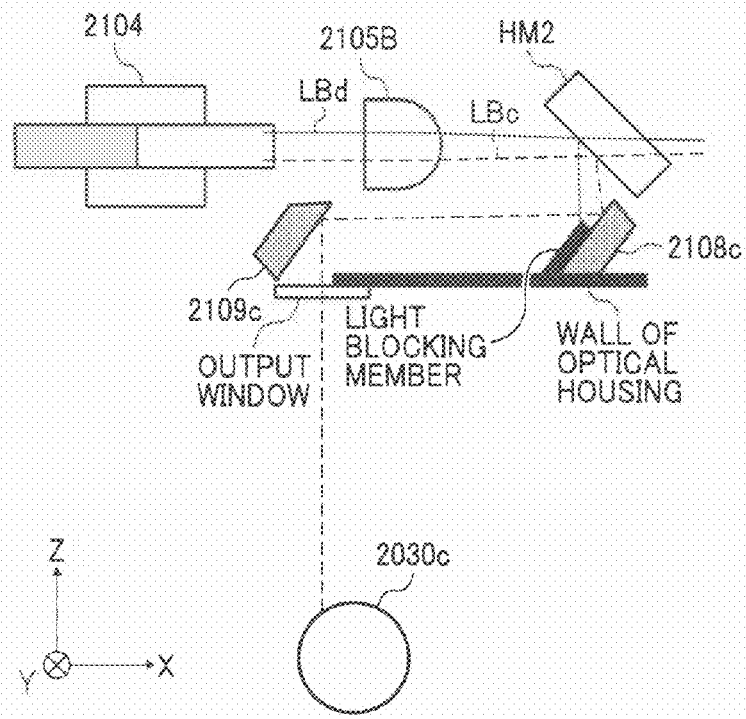
FIG. 21 is a diagram illustrating a fifth light blocking method.

In a fifth light blocking method, a light blocking member is newly arranged on the optical path of undesired light (refer to FIG. 21). This light blocking member may be integrated with the optical housing as a single body or may be a member individually metal-plated or resin-formed. For example, it is possible to prevent the undesired light beam LBd from being directed to the steering mirror 2109c by arranging the light blocking member on the optical path of the undesired light beam LBd between the half mirror HM2 and the steering mirror 2108c (refer to FIG. 21).

Figure 22:
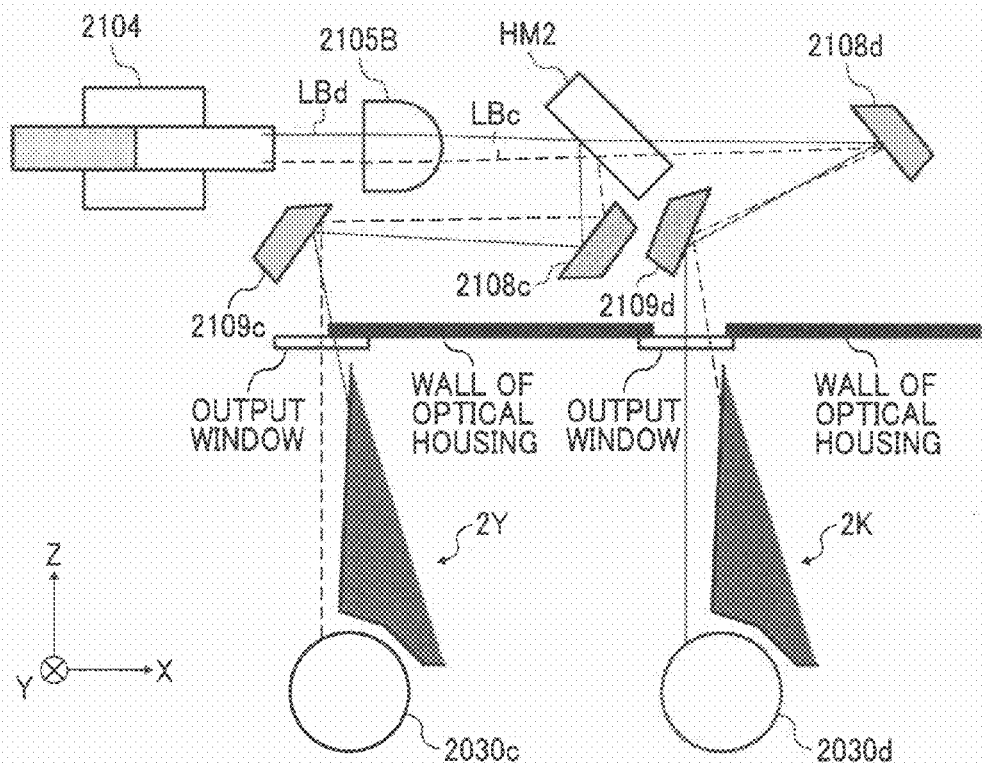
FIG. 22 is a diagram illustrating a sixth light blocking method.

In a sixth light blocking method, light is blocked in an aperture inside the image forming unit after being output from the optical scanning device until reaching the photosensitive drum (refer to FIG. 22). For example, it is possible to prevent the undesired light beam LBd from being directed to the photosensitive drum 2030c by arranging the image forming unit 2Y such that the undesired light beam LBd transmitting through the output window is blocked by a cover member of the image forming unit 2Y (refer to FIG. 22). In addition, it is possible to prevent the undesired light beam LBc from being directed to the photosensitive drum 2030d by arranging the image forming unit 2K such that the undesired light beam LBc transmitting through the output window is blocked by a cover member of the image forming unit 2K (refer to FIG. 22).

As apparent from the aforementioned description, in the optical scanning device 2010 of the first configuration example, a splitting optical element of the optical scanning device of the invention includes the half mirrors HM1 and HM2. In addition, a first light beam is the light beam LBa, and a second light beam is the light beam LBb in the half mirror HM1. Furthermore, a first light beam is the light beam LBd, and a second light beam is the light beam LBc in the half mirror HM2.

As described above, the optical scanning device 2010 of the first configuration example of the invention includes the light source 2200A that emits the light beams LBa and LBb, the light source 2200B that emits the light beams LBc and LBd, the optical deflector 2104 that deflects a plurality of light beams from each light source, the half mirror HM1 where the light beams LBa and LBb deflected by the optical deflector 2104 is incident through the scanning lens 2105A made of resin, and the half mirror HM2 where the light beams LBc and LBd deflected by the optical deflector 2104 are incident through the scanning lens 2105B made of resin.

The light emitting portion for emitting the light beam LBa and the light emitting portion for emitting the light beam LBb are separated from each other with respect to the Z-axis direction. In addition, the light beams LBa and LBb incident to the optical deflector 2104 are separated from each other with respect to the Z-axis direction.

The light emitting portion for emitting the light beam LBc and the light emitting portion for emitting the light beam LBd are separated from each other with respect to the Z-axis direction. In addition, the light beams LBc and LBd incident to the optical deflector 2104 are separated from each other with respect to the Z-axis direction.

Principal rays of the light beams LBa and LBb incident to the half mirror HM1 are nonparallel to each other in the surface orthogonal to the main-scanning direction. In addition, principal rays of the light beams LBc and LBd incident to the half mirror HM2 are nonparallel to each other in the surface orthogonal to the main-scanning direction.

The light beam LBa transmitting through the half mirror HM1, the light beam LBb reflected by the half mirror HM1, the light beam LBc reflected by the half mirror HM2, and the light beam LBd transmitting through the half mirror HM2 are guided to the corresponding photosensitive drums. On the other hand, the light beam LBb transmitting through the half mirror HM1, the light beam LBa reflected by the half mirror HM1, the light beam LBd reflected by the half mirror HM2, and the light beam LBc transmitting through the half mirror HM2 do not reach any photosensitive drum.

In addition, since the scanning lenses that have been provided in two (upper and lower) stages in the related art can be integrated into a single stage by applying the half mirror, it is possible to reduce the number of lenses in the scanning optical system and realize a thin optical housing. That is, a plurality of light beams output from the light source can be delivered to compact space and guided to the photosensitive drums corresponding to each light beam.

In addition, since the half mirror is used as an optical splitter, it is possible to obtain an inexpensive and simple configuration.

That is, it is possible to miniaturize (thin down) the optical scanning device 2010 while optical scanning is consistently performed with high precision without causing high cost.

In addition, in the first configuration example of the invention, the diffraction lens is used as the collimating lens. In this case, it is possible to perform temperature correction when an ambient temperature changes.

In addition, in the first configuration example of the invention, the XZ cross sections of each steering mirror have a trapezoidal shape. In this case, it is possible to prevent vignetting of the closely passing light beam and avoid interference with the optical housing. This is effective to thinning of the optical housing as well as prevention of vignetting of the light beam.

In addition, in the first configuration example of the invention, it is possible to realize a highly stable optical scanning device without increasing the number of components. Therefore, it is unnecessary to increase the use amount of materials for manufacturing the optical scanning device. As a result, it is possible to suppress a load from an environmental viewpoint regarding a resource output amount and a plastic garbage discharge amount.

Figure 23:
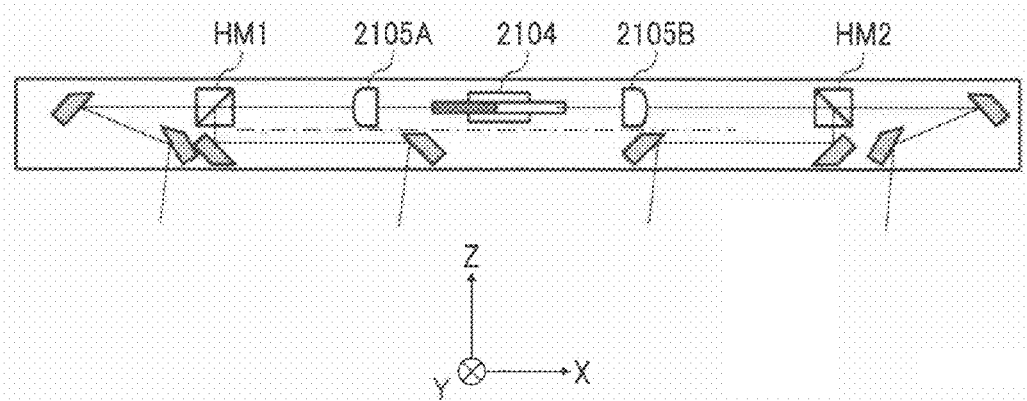
FIG. 23 is a diagram illustrating a modified example of the optical path of the light beam directed from the optical scanning device to the photosensitive drum.

In addition, the light beam output from the optical scanning device and then directed to the scanning target surface may be inclined with respect to the Z axis as shown in FIG. 23.

While a case where undesired light is incident to the light guiding optical system has been described hereinbefore, the size and the arrangement position of each steering mirror may be set such that undesired light is not incident to the light guiding optical system. In this case, for example, setting can be made such that undesired light is guided to the wall of the optical housing, and a special light blocking member is not necessary.

Subsequently, while the configuration examples will be described, like reference numerals denote like elements as in the first configuration example described above, and description thereof will not be repeated.

Second Configuration Example

Figure 24:
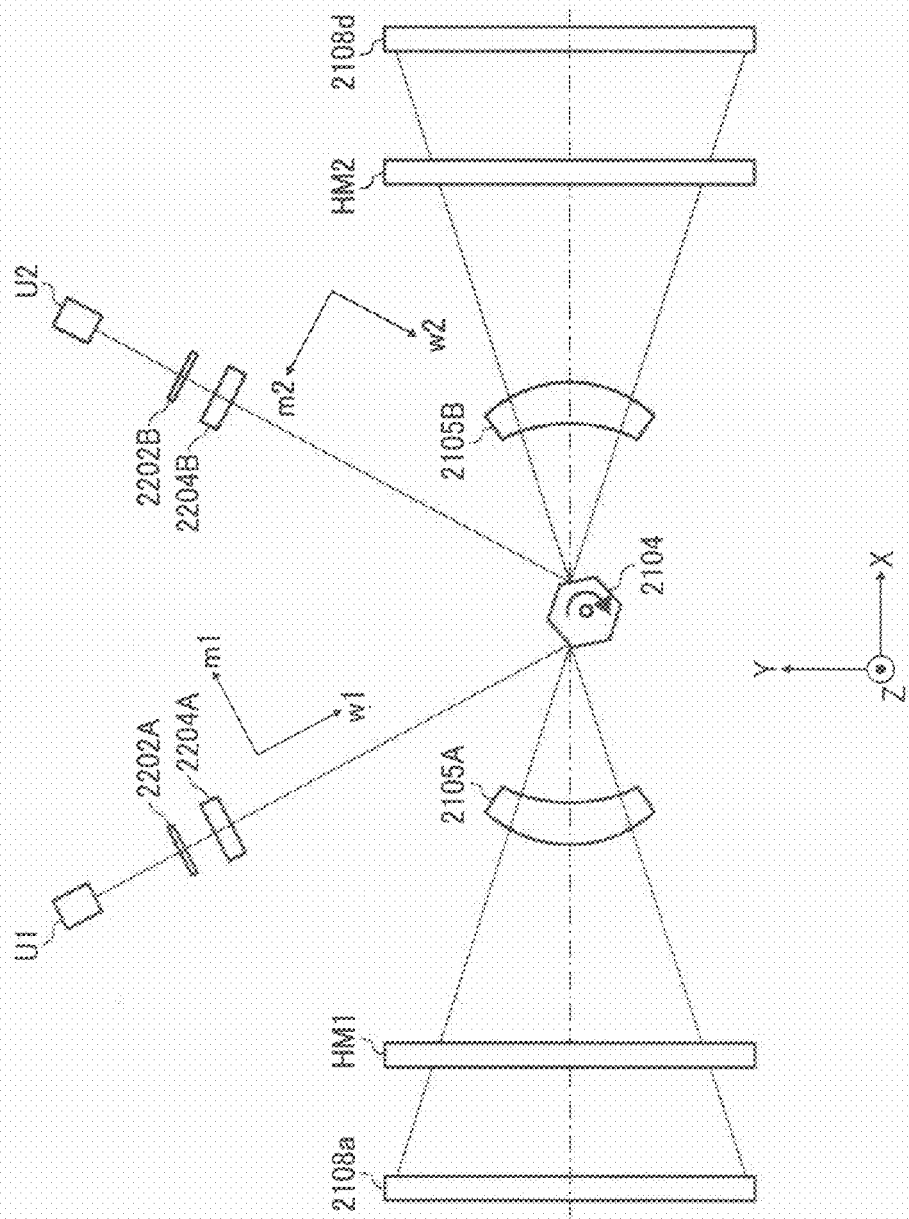
FIG. 24 is a diagram illustrating a second configuration example of the optical scanning device.

As shown in FIG. 24, the second configuration example is characterized that a light source device U1 is used instead of the light source 2200A and the coupling lens 2201A described in conjunction with the first configuration example, and a light source device U2 is used instead of the light source 2200B and the coupling lens 2201B.

Figure 25:
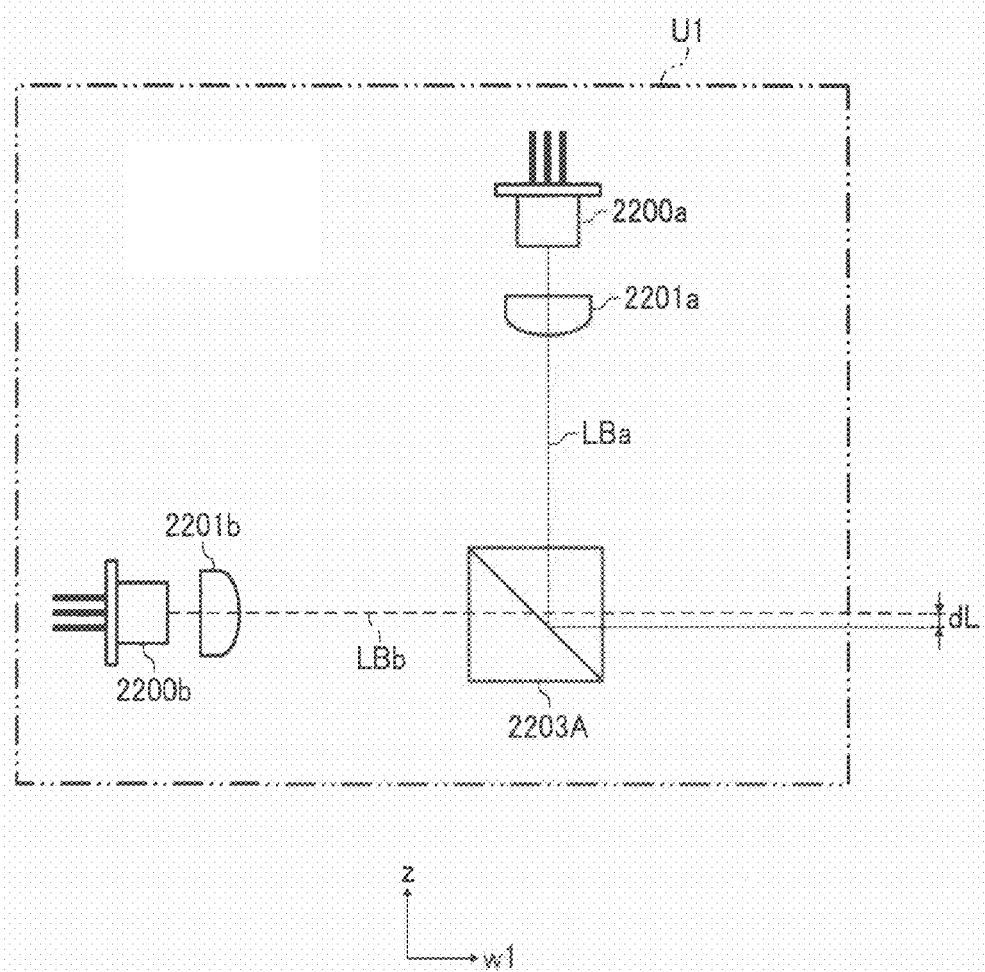
FIG. 25 is a diagram illustrating a light source device U1 in the second configuration example.

For example, as shown in FIG. 25, the light source device U1 includes two light sources 2200*a* and 2200*b*, two coupling lenses 2201*a* and 2201*b*, and a synthesizing element 2203A.

For example, as shown in FIG. 25, the light source device U1 includes two light sources 2200*a* and 2200*b*, two coupling lenses 2201*a* and 2201*b*, and a synthesizing element 2203A.

Figure 26:
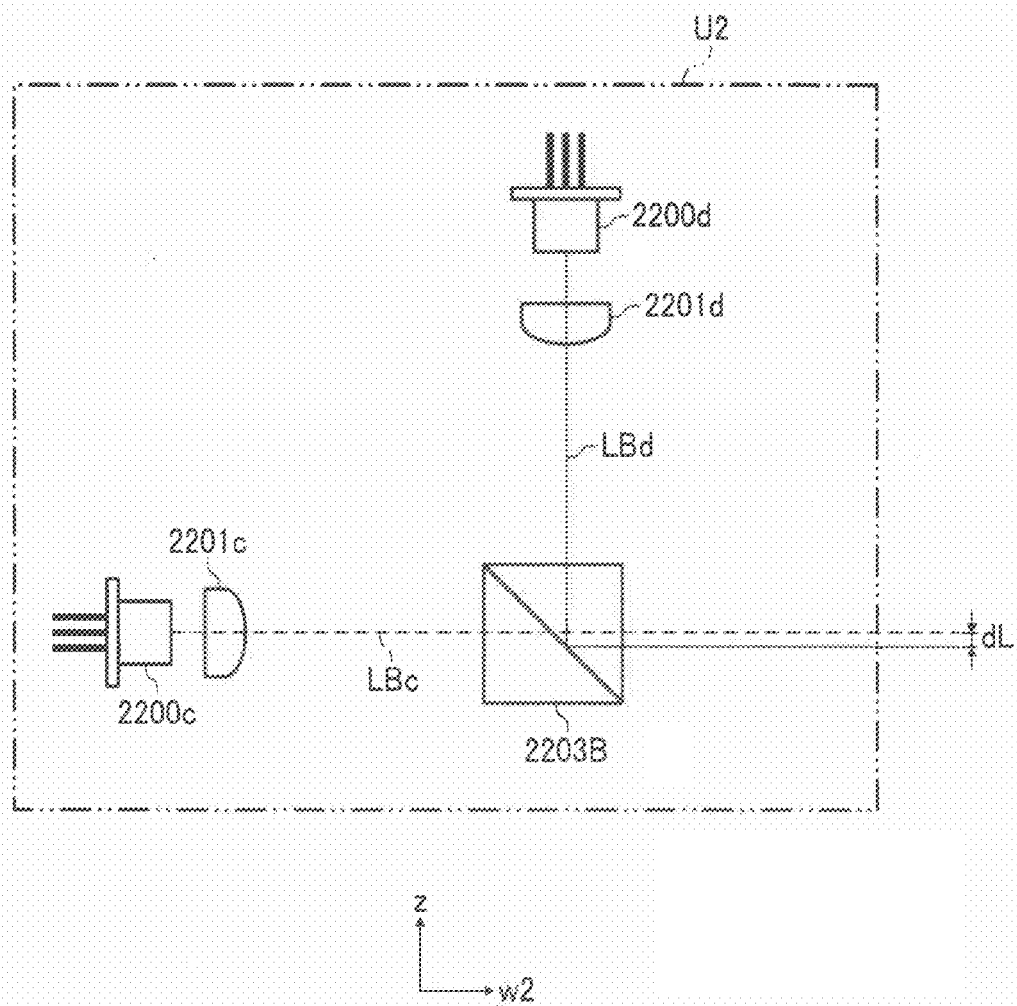
FIG. 26 is a diagram illustrating a light source device U2 in the second configuration example.
Figure 27:
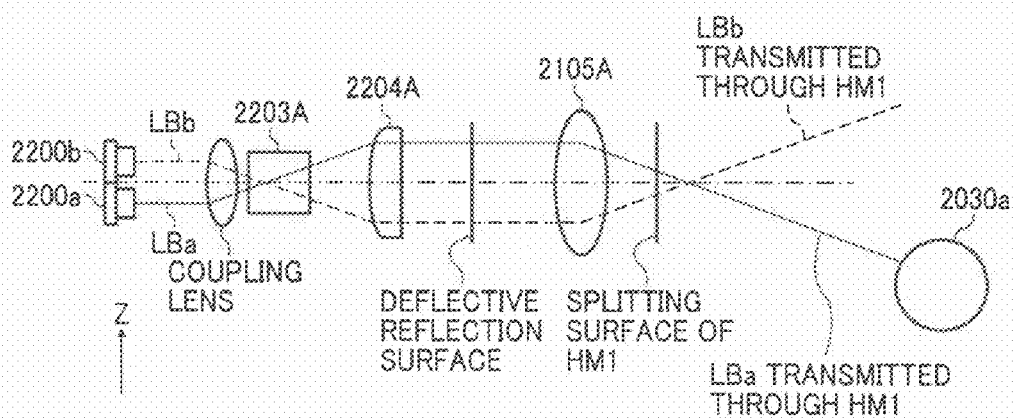
FIG. 27 is a schematic diagram illustrating the optical path LBa output from a light source 2200a and the optical path of the light beam LBb output from a light source 2200b (first)
Figure 28:
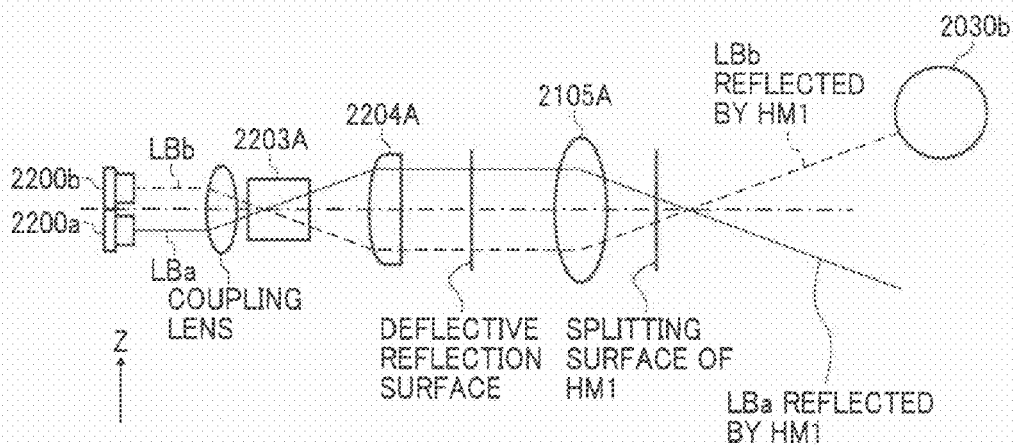
FIG. 28 is a schematic diagram illustrating the optical path LBa output from the light source 2200a and the optical path of the light beam LBb output from the light source 2200b (second)

For example, as shown in FIG. 26, the light source device U2 includes two light sources 2200*c* and 2200*d*, two coupling lenses 2201*c* and 2201*d*, and a synthesizing element 2203B.

Each light source has a semiconductor laser obtained by packaging a single edge light emitting element having a single light emitting portion with metal or the like.

Here, the reference symbol LBa denotes the light beam output from the light source 2200*a*, the reference symbol LBb denotes the light beam output from the light source 2200*b*, the reference symbol LBc denotes the light beam output from the light source 2200*c*, and the reference symbol LBd denotes the light beam output from the light source 2200*d*.

The coupling lens 2201*a* couples the light beams output from the light source 2200*a* to a subsequent optical system in any one of states of collimated light, convergent light, and divergent light.

The coupling lens 2201*b* couples the light beams output from the light source 2200*b* to a subsequent optical system in any one of states of collimated light, convergent light, and divergent light.

The coupling lens 2201*c* couples the light beams output from the light source 2200*c* to a subsequent optical system in any one of states of collimated light, convergent light, and divergent light.

The coupling lens 2201*d* couples the light beams output from the light source 2200*d* to a subsequent optical system in any one of states of collimated light, convergent light, and divergent light.

The synthesizing element 2203A synthesizes the optical path of the light beam including the coupling lens 2201*a* and the optical path of the light beam including the coupling lens 2201*b*.

The synthesizing element 2203B synthesizes the optical path of the light beam including the coupling lens 2201*c* and the optical path of the light beam including the coupling lens 2201*d*.

The interval between two light beams output from each synthesizing element with respect to the Z axis is set to be approximately equal to the gap dL of the first configuration example described above. As a result, similar to the first configuration example, it is possible to split undesired light (refer to FIGS. 27 and 28).

As described above, the optical scanning device 2010 of the second configuration example of the invention includes the light source 2200*a* that outputs the light beam LBa, the light source 2200*b* that outputs the light beam LBb, the light source 2200*c* that outputs the light beam LBc, the light source 2200*d* that outputs the light beam LBd, the synthesizing element 2203A that makes both the light beams LBa and LBb be directed to the optical deflector 2104, the synthesizing element 2203B that makes both the light beams LBc and LBd be directed to the optical deflector 2104, the optical deflector 2104 that deflects a plurality of light beams from each synthesizing element, the half mirror HM1 that receives the light beams LBa and LBb deflected by the optical deflector 2104 through the scanning lens 2105A made of resin, and the half mirror HM2 that receives the light beams LBc and LBd deflected by the optical deflector 2104 through the scanning lens 2105B made of resin.

The light beams LBa and LBb output from the synthesizing element 2203A are separated from each other with respect to the Z-axis direction. In addition, the light beams LBa and LBb incident to the optical deflector 2104 are separated from each other with respect to the Z-axis direction.

The light beams LBc and LBd output from the synthesizing element 2203B are separated from each other with respect to the Z-axis direction. In addition, the light beams LBc and LBd incident to the optical deflector 2104 are separated from each other with respect to the Z-axis direction.

The principal rays of the light beams LBa and LBb incident to the half mirror HM1 are nonparallel to each other in a plane orthogonal to the main-scanning direction. In addition, the principal rays of the light beams LBc and LBd incident to the half mirror HM2 are nonparallel to each other in a plane orthogonal to the main-scanning direction.

The light beam LBa transmitting through the half mirror HM1, the light beam LBb reflected by the half mirror HM1, the light beam LBc reflected by the half mirror HM2, the light beam LBd transmitting through the half mirror HM2, the light beam LBb which is guided to the corresponding photosensitive drum and transmits through the half mirror HM1, the light beam LBa reflected by the half mirror HM1, the light beam LBd reflected by the half mirror HM2, and the light beam LBc transmitting through the half mirror HM2 do not reach any photosensitive drum.

In this case, the optical scanning device 2010 can obtain the same effects as those of the first configuration example described above.

In addition, since the synthesizing element is used, it is possible to miniaturize the pre-deflector optical system.

Figure 29:
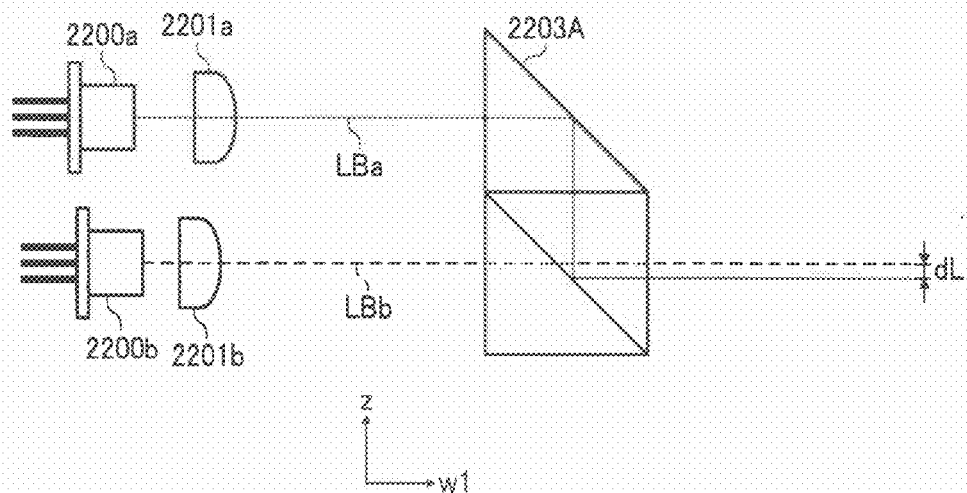
FIG. 29 is a diagram illustrating a modified example of a synthesizing element 2203A.
Figure 30:
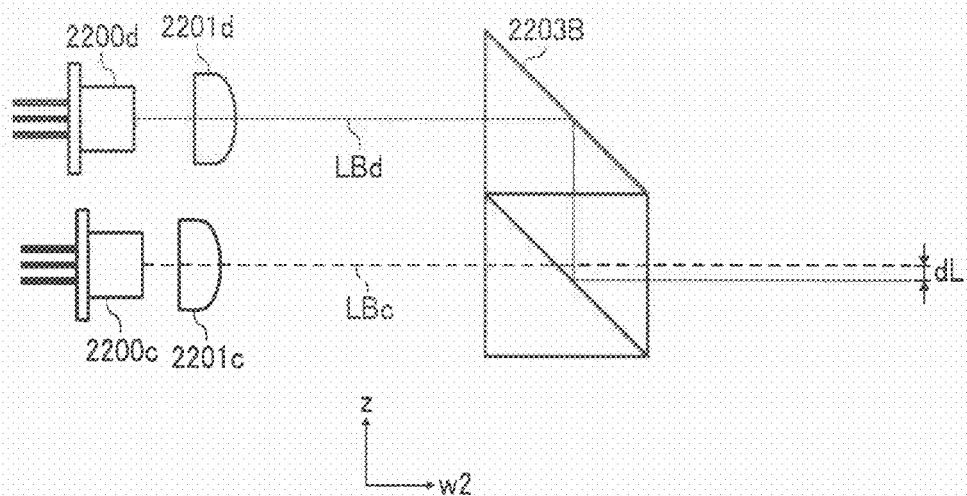
FIG. 30 is a diagram illustrating a modified example of a synthesizing element 2203B.
Figure 31:
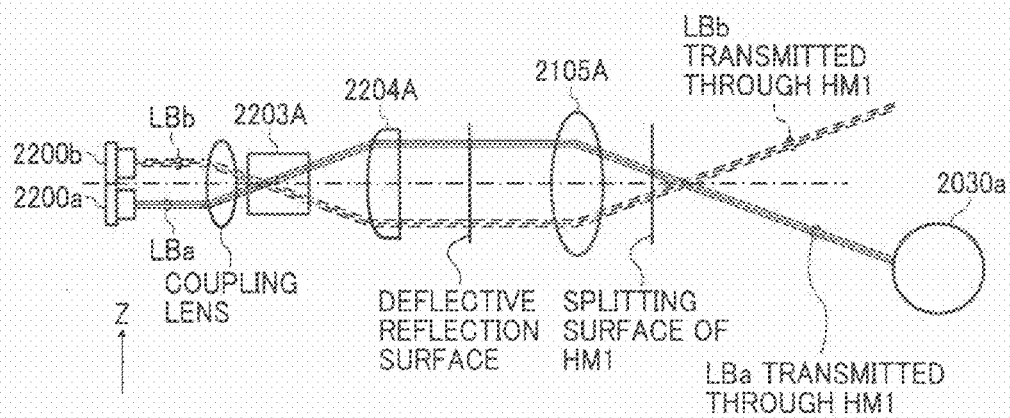
FIG. 31 is a schematic diagram illustrating optical paths of a plurality of light beams output from the light source 2200a and optical paths of a plurality of light beams output from the light source 2200b in a third configuration example of the optical scanning device (first)
Figure 32:
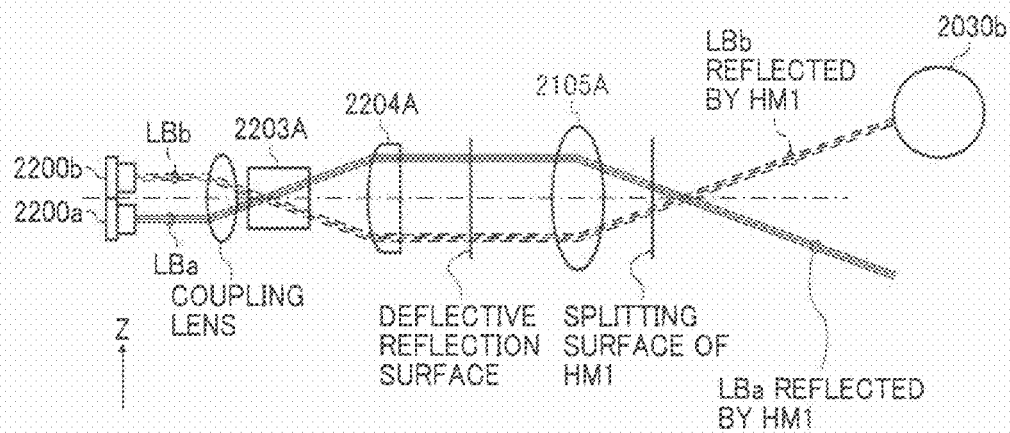
FIG. 32 is a schematic diagram illustrating optical paths of a plurality of light beams output from the light source 2200a and optical paths of a plurality of light beams output from the light source 2200b in a third configuration example of the optical scanning device (second)
Figure 33:
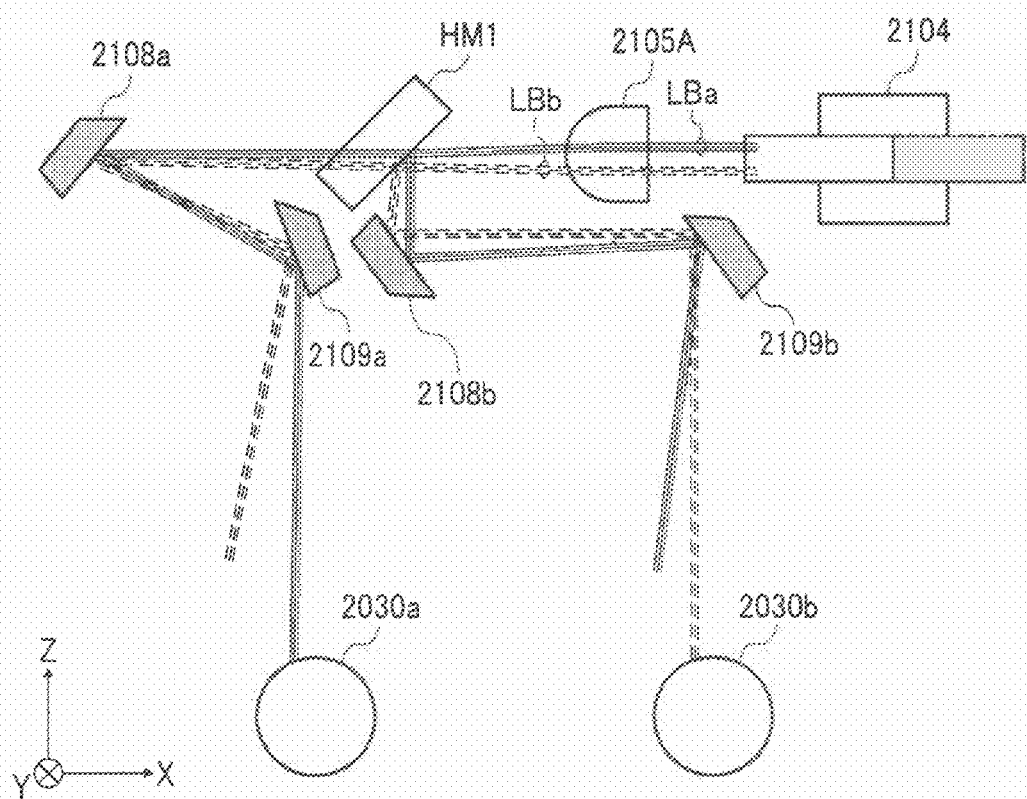
FIG. 33 is a diagram illustrating optical paths of a plurality of light beams polarized by the optical deflector in a third configuration example of the optical scanning device.

In addition, while a polarization-independent half mirror having an approximately cubic shape is used as each synthesizing element in FIGS. 25 and 26, the invention is not limited thereto. For example, as shown in FIGS. 29 and 30, a polarization-independent half mirror prism having a prismatic column shape of which a bottom plane is trapezoidal may be used. For example, a synthesizing element appropriate to the installation position of each light source may be used such that both light beams output from the synthesizing element are directed to the optical deflector 2104, and the interval between the two light beams with respect to the Z-axis direction is approximately equal to the gap dL.

Third Configuration Example

The third configuration example is characterized in that each light source of the second configuration example has a plurality of light emitting portions. In this case, similar to the second configuration example, it is possible to readily split undesired light (refer to FIGS. 31 to 33). In addition, it is possible to improve a rate (efficiency) of forming the latent image.

Compared to the first configuration example, as shown in FIG. 34A, the aforementioned light source 2200A may be substituted with a light source 2200A' so that each of the light beams LBa and LBb is converted into a plurality of light beams. Similarly, for example, as shown in FIG. 34B, the aforementioned light source 2200B may be substituted with a light source 2200B' so that each of the light beams LBc and LBd is converted into a plurality of light beams. In this case, similar to the first configuration example, it is possible to split undesired light. In addition, it is possible to improve a rate (efficiency) of forming the latent image.

Fourth Configuration Example

The fourth configuration example is characterized in that each synthesizing element 2203A and 2203B of the second configuration example is substituted with a polarization splitting element, and each half mirror HM1 and HM2 is substituted with a polarization splitting element. In this case, it is advantageous in that most of the light beams output from the light source can be used. In addition, when the half mirror is used as in the second configuration example, an available light amount is reduced by a half.

However, a typical polarization splitting element has a function of splitting an incident light beam into two linearly-polarized light beams orthogonal to each other. Herein, a characteristic of splitting light, including light beams La and Lb having two linearly-polarized light beams of which polarization directions are orthogonal to each other, incident to the polarization splitting element into light beams La' and Lb' depending on each polarization direction without mixing is referred to as a "polarization splitting characteristic."

If the light amounts of the light beams La, Lb, La', and Lb' are denoted by A, B, A', and B', respectively, a relationship thereof is expressed as $A \propto A'$ and $B \propto B'$ for an ideal polarization splitting characteristic so that the light amounts A' and B' are not related to the light amounts A and B.

Figure 35:
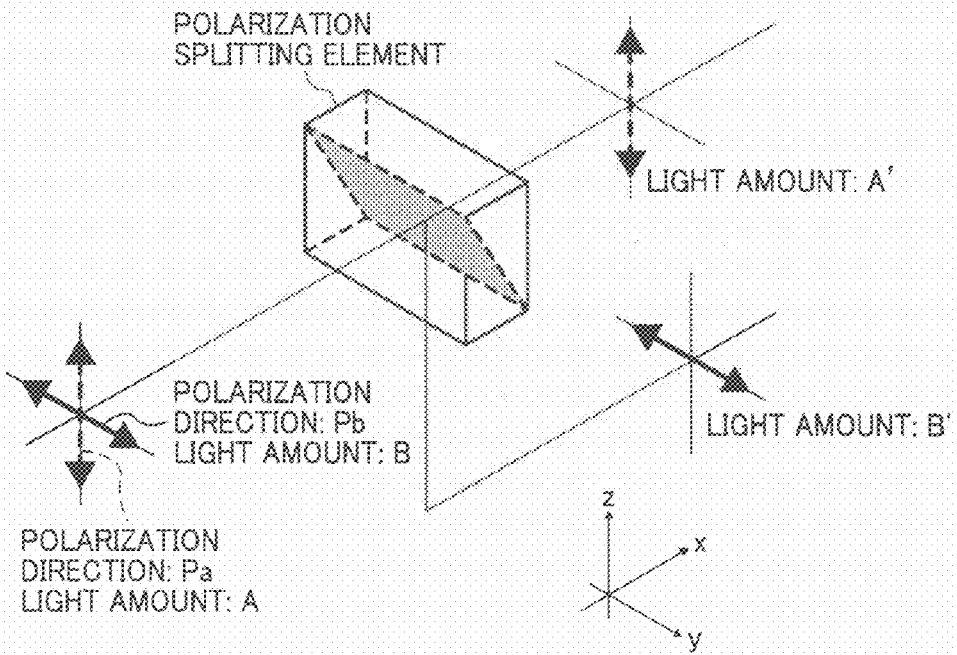
FIG. 35 is a diagram illustrating an ideal polarization splitting characteristic.

FIG. 35 is a functional schematic diagram illustrating a polarization splitting element. The polarization directions of the light beams La and Lb are denoted by Pa and Pb, respectively. Here, the polarization directions Pa and Pb are orthogonal to each other and parallel to the Z axis and the Y axis, respectively. A polarization splitting element having an ideal polarization splitting characteristic splits the optical path according to the orthogonal polarization direction.

Here, it is assumed that the light beams La and Lb transmit through a birefringence member. "Birefringence" means that a refractive index perceivable by the light beam is different depending on a direction. In an actual optical scanning device, a scanning lens made of resin is widely used because its manufacturing efficiency is high, and a complicated plane shape can be readily realized. Such an optical element made of resin generally has birefringence and acts as an optically anisotropic medium.

In a resin optical element manufactured by molding a resin material through an injection molding or the like, optical anisotropy is partially generated inside the optical element because polymer of the resin in a certain area is solidified while orientation thereof is aligned during the molding procedure. If a linear polarization is incident to this optical element, a phase difference is generated on an orthogonal cross section due to a fundamental characteristic of an optically anisotropic medium, so that the polarization direction is rotated. In addition, since an internal structure of an optical element made of glass is amorphous and optically isotropic, generally, birefringence is seldom generated unlike resin.

Figure 36:
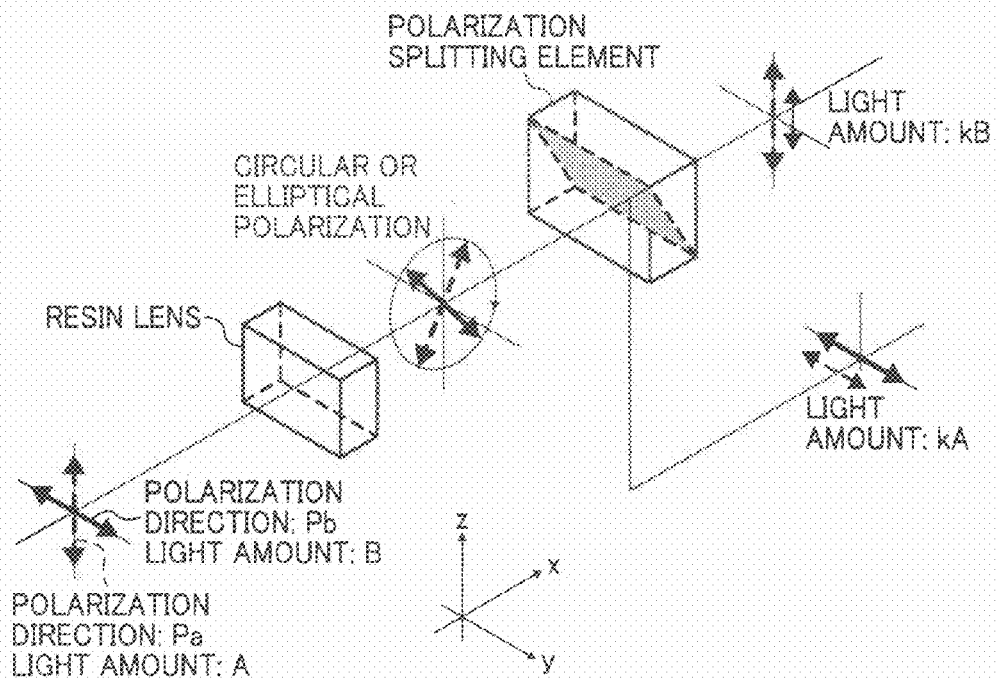
FIG. 36 is a diagram illustrating a case where a light beam is incident to a polarization splitting element through a resin lens with birefringence.

In this regard, as shown in FIG. 36, when the aforementioned light beams La and Lb are incident to the lens that is made of resin and has birefringence (hereinafter, referred to as a "resin lens"), the direction of polarization is rotated. Due to birefringence, rotating linearly-polarized light or elliptically-polarized light is output. If the light is incident to the polarization splitting element in such a polarization state, the output light amounts A' and B' of the polarization splitting element have a relationship expressed as $A' \propto (A+kB)$ and $B' \propto (B+kA)$ (where, k denotes a proportionality factor) so that the light amount of the other part is mixed. This phenomenon is called a "light amount crosstalk," which expresses degradation in the polarization splitting characteristic.

It is conceived that the birefringence of the resin lens is caused by stagnation in resin flowing during injection molding or irregular concretion during cooling, and the birefringence grows depending on a thickness or thickness unevenness. Therefore, a resin lens that is thin and has little thickness unevenness is considered as a lens relatively less influenced by birefringence.

However, it is difficult to correct aberration on the scanning target surface using only a single resin lens that is thin and has little thickness unevenness, and it may be difficult to keep up with a recent trend of a high image quality. Meanwhile, if the number of resin lenses increases, birefringence influence is accumulated, and a polarization splitting characteristic may be degraded finally.

In this case, it is readily envisaged that the resin lens may be disposed in a subsequent stage of the polarization splitting element. However, if the resin lens is disposed in each of the optical paths of the two light beams split by the polarization splitting element, layout subsequent to the polarization splitting element is limited, and it adversely affects thinning of the optical scanning device.

In the fourth configuration example of the invention, for example, the polarization directions of the light beams output from each light source are perpendicular (S-polarized) to the incident plane (a plane containing the incident light beam and the output light beam) of the polarization splitting surface of the polarization splitting element.

Figure 37:
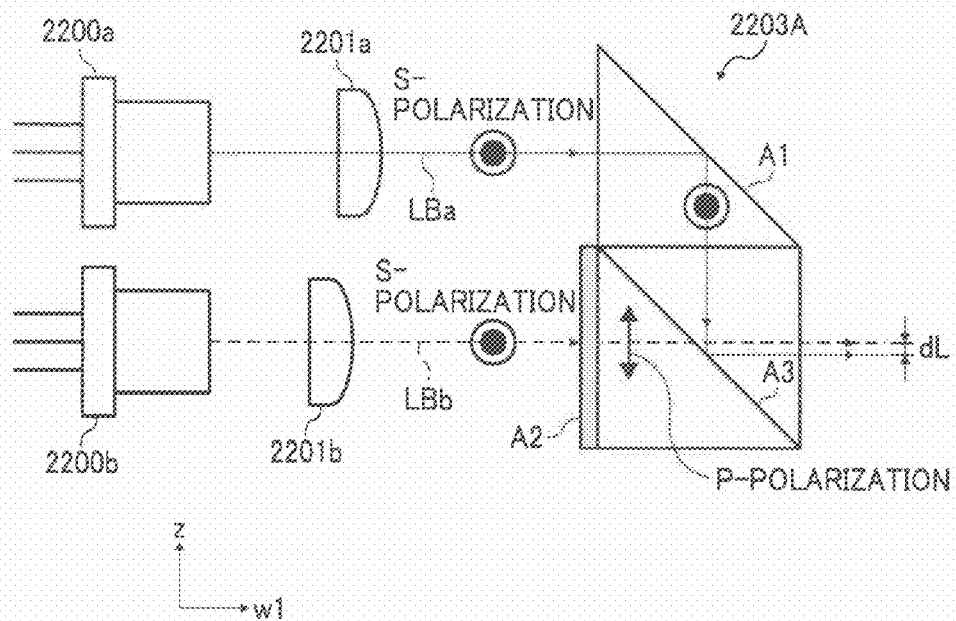
FIG. 37 is a diagram illustrating a synthesizing element 2203A in a fourth configuration example of the optical scanning device.
Figure 38:
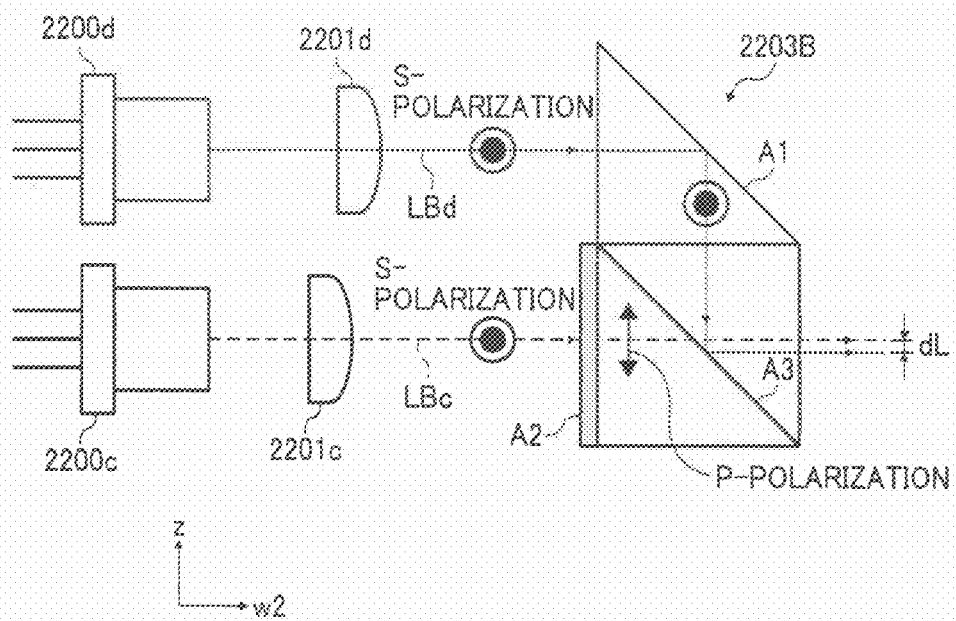
FIG. 38 is a diagram illustrating a synthesizing element 2203B in a fourth configuration example of the optical scanning device.
Figure 39:
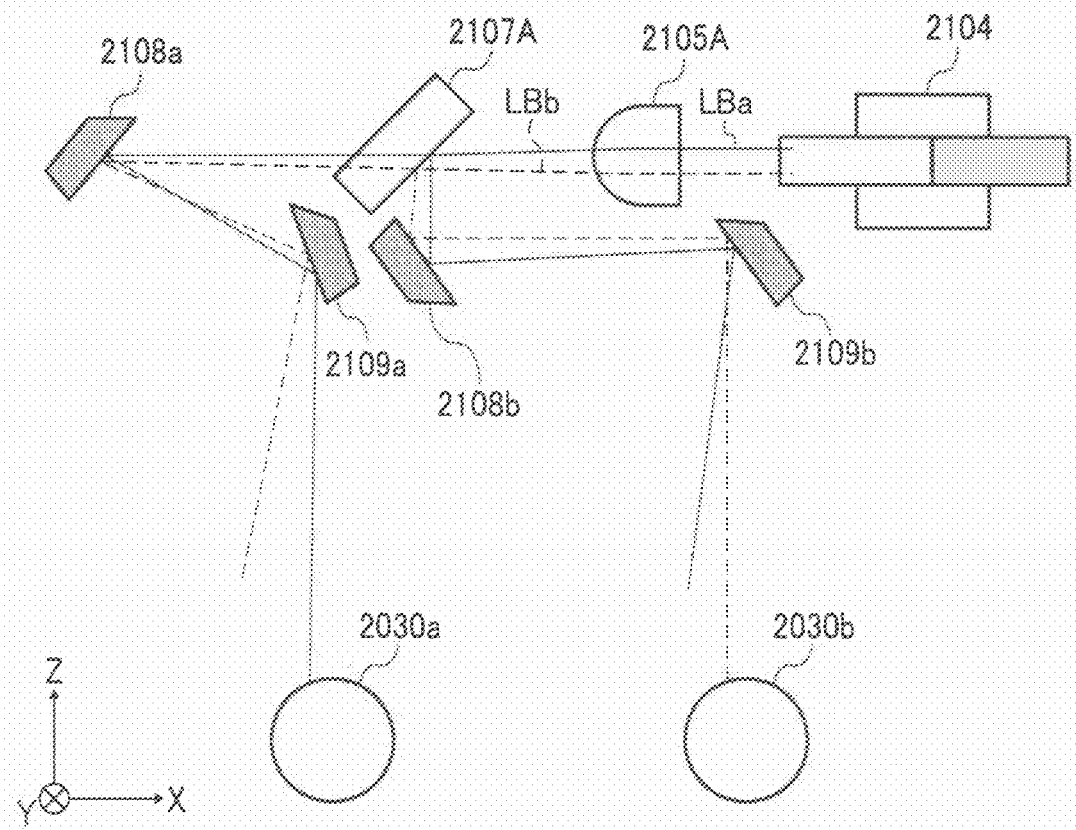
FIG. 39 is a diagram illustrating two light beams LBa and LBb incident to a polarization splitting element 2107A in a fourth configuration example of the optical scanning device.
Figure 40:
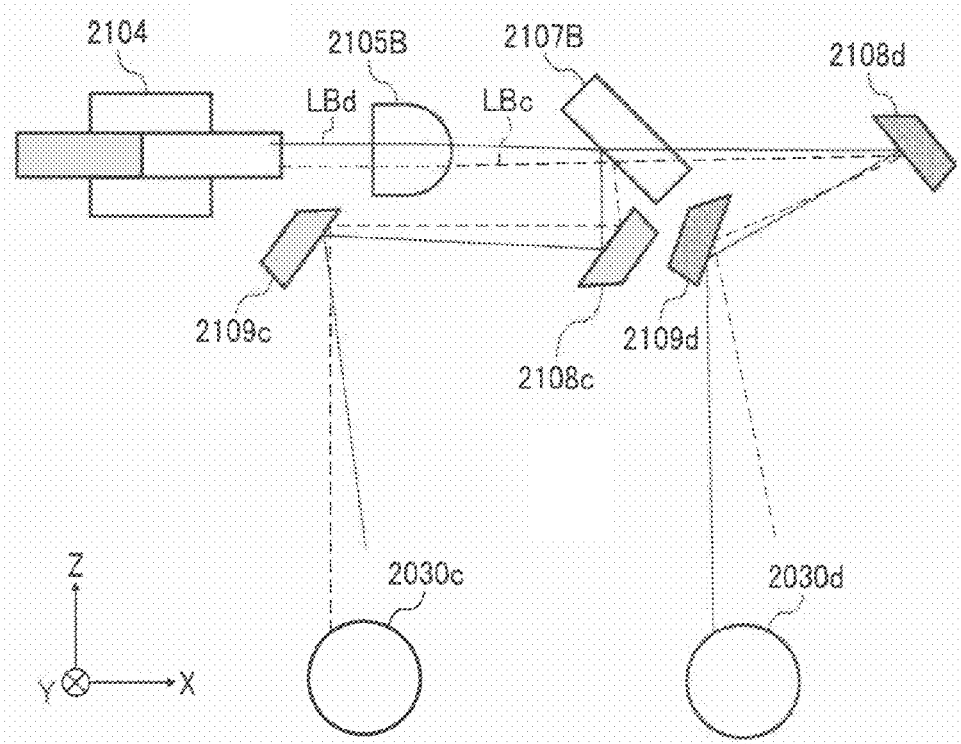
FIG. 40 is a diagram illustrating two light beams LBc and LBd incident to a polarization splitting element 2107B in a fourth configuration example of the optical scanning device.

FIG. 37 illustrates a synthesizing element 2203A when the light beams are output from light sources 2200a and 2200b to the +w1 direction. In addition, FIG. 38 illustrates a synthesizing element 2203B when the light beams are output from the light sources 2200c and 2200d to the +w2 direction.

Each synthesizing element includes a triangular column prisms or cubic prism provided on the reflection surface A1, a half-wave plate A2, and a polarization splitting surface A3. Here, the polarization splitting surface A3 has a splitting characteristic that transmits P-polarized light and reflects S-polarized light.

As shown in FIG. 37, the light beam LBa output from the light source 2200a is incident to the synthesizing element 2203A through the coupling lens 2201a, reflected to the −Z direction on the reflection surface A1, and further reflected to the +w1 direction on the polarization splitting surface A3. In addition, the light beam LBb output from the light source 2200b is incident to the synthesizing element 2203A through the coupling lens 2201b and converted into P-polarized light by the half-wave plate A2, and transmits through the polarization splitting surface A3.

Similarly, in this case, both the light beams LBa and LBb output from the synthesizing element are directed to the optical deflector 2104, and the interval between the two light beams with respect to the Z-axis direction is set to be approximately equal to the gap dL.

As shown in FIG. 38, the light beam LBd output from the light source 2200d is incident to the synthesizing element 2203B through the coupling lens 2201B, reflected to the −Z direction on the reflection surface A1, and further reflected to the +w2 direction on the polarization splitting surface. In addition, the light beam LBc output from the light source 2200c output from the light source 2200c is incident to the synthesizing element 2203B through the coupling lens 2201c and converted by the half-wave plate A2 into P-polarized light, and transmits through the polarization splitting surface A3.

Similarly, in this case, both light beams LBc and LBd output from the synthesizing element are directed to the optical deflector 2104, and the interval between the two light beams with respect to the Z-axis direction is set to be approximately equal to the gap dL.

A polarization beam splitter having a polarization splitting surface that transmits S-polarized light is used as the polarization splitting element substituted with the half mirror HM1 (referred to as a polarization splitting element 2107A) and the polarization splitting element substituted with the half mirror HM2 (referred to as a polarization splitting element 2107B).

The two light beams LBa and LBb output from the synthesizing element 2203A are incident to the optical deflector 2104 through the aperture plate 2202A and the collimating lens 2204A. The two light beams LBa and LBb deflected by the optical deflector 2104 are incident to the polarization splitting element 2107A through the scanning lens 2105A. The light beams LBa and LBb incident to the polarization splitting element 2107A are nonparallel to each other on a plane where the principle rays thereof are orthogonal to the main-scanning direction (refer to FIG. 39).

Here, since the light beam LBa incident to the polarization splitting element 2107A is S-polarized, most of them transmit through the polarization splitting surface of the polarization splitting element 2107A and are guided to the photosensitive drum 2030a via the steering mirror 2108a and the steering mirror 2109a. Meanwhile, since the light beam LBb incident to the polarization splitting element 2107A is P-polarized, most of them are reflected by the polarization splitting surface of the polarization splitting element 2107A and guided to the photosensitive drum 2030b via steering mirrors 2108b and 2109b.

In addition, the two light beams LBc and LBd output from the synthesizing element 2203B are incident to the optical deflector 2104 through the aperture plate 2202B and the collimating lens 2204B. The two light beams LBc and LBd deflected by the optical deflector 2104 are incident to the polarization splitting element 2107B through the scanning lens 2105B. Principal rays of the light beams LBc and LBd incident to the polarization splitting element 2107B are non-parallel to each other in a plane orthogonal to the main-scanning direction.

Here, since the light beam LBc incident to the polarization splitting element 2107B is P-polarized, most of them are reflected on the polarization splitting surface of the polarization splitting element 2107B and guided to the photosensitive drum 2030c via steering mirror 2108c and the steering mirror 2109c. Meanwhile, since the light beam LBd incident to the polarization splitting element 2107B is S-polarized, most of them transmit through the polarization splitting surface of the polarization splitting element 2107B and are guided to the photosensitive drum 2030d via the steering mirror 2108d and the steering mirror 2109d.

However, in some cases, a polarization direction of the linearly-polarized light output from the light source is disturbed in the middle of an optical path due to metal deflection on the deflective reflection surface of the optical deflector 2104, birefringence of the scanning lens made of resin, or the like. Specifically, since metal deflection on the deflective reflection surface and birefringence of the scanning lens made of resin change linearly-polarized light into elliptically-polarized light, the light beam necessary to be reflected on the polarization splitting surface of the polarization beam splitter is mixed into the transmitted light beam, and the light beam necessary to transmit is mixed into the reflected light beam. That is, the polarization splitting characteristic of the polarization beam splitter is degraded.

In the fourth configuration example, even when a part of the light beam intended to be reflected on the polarization splitting surface of the polarization beam splitter is transmitted, or a part of the light beam intended to be transmitted is reflected, it is possible to split the light beam as in the second configuration example without using any special optical element.

That is, it is possible to improve light use efficiency in comparison with the second configuration example and split undesired light as in the second configuration example.

In addition, since a scanning lens made of resin can be used with excellent shaping accuracy and inexpensive cost, it is possible to realize a miniaturized image forming device having an excellent image quality with inexpensive cost.

Furthermore, the polarization splitting characteristics of each polarization splitting element are not necessary to be perfect. If the polarization splitting element transmits linearly-polarized light with P-polarization and reflects linearly-polarized light with S-polarization, the transmittance for the P-polarization may be set to 100% or 90%. In addition, transmittance for the P-polarization may be set to change depending on the incident angle of the scanning light. This is similarly applied to the transmittance of the S-polarization.

Figure 41:
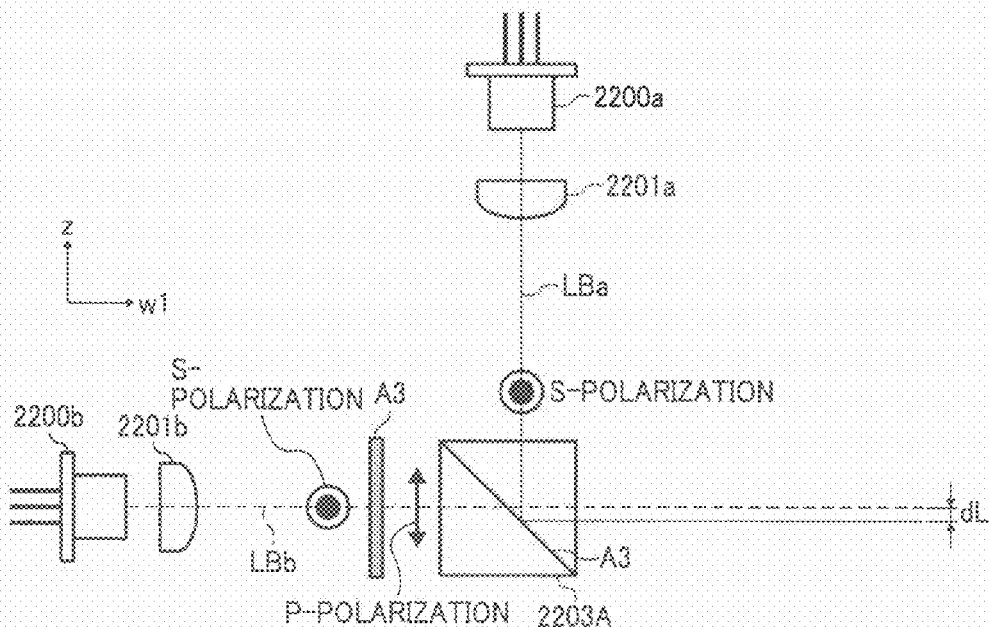
FIG. 41 is a diagram illustrating a modified example of the synthesizing element 2203A in a fourth configuration example of the optical scanning device.
Figure 42:
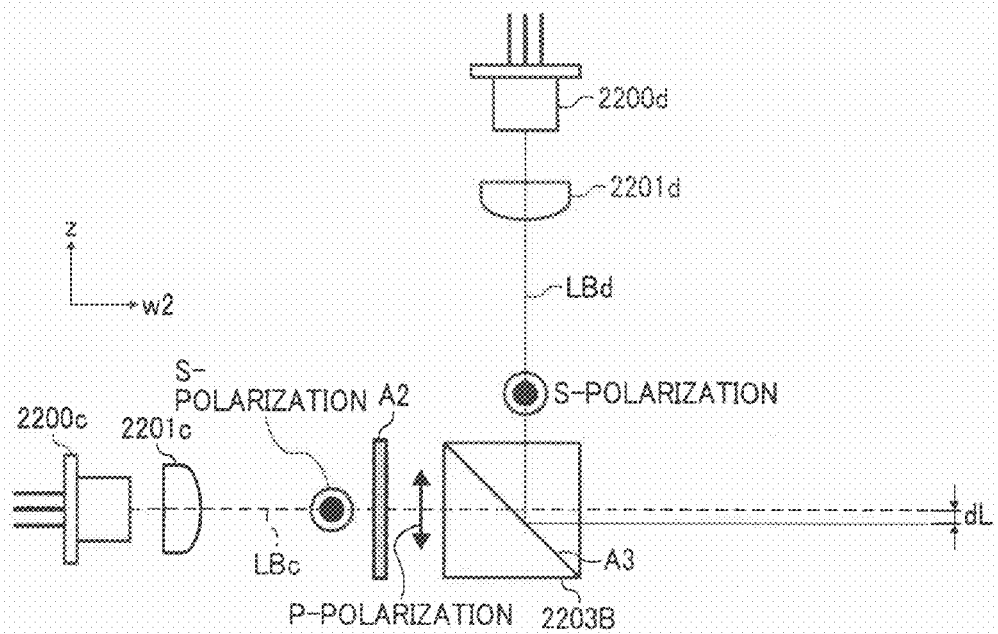
FIG. 42 is a diagram illustrating a modified example of the synthesizing element 2203B in a fourth configuration example of the optical scanning device.

FIGS. 41 and 42 illustrate an example in which the polarization beam splitter is used in each synthesizing element 2203A and 2203B.

Figure 43:
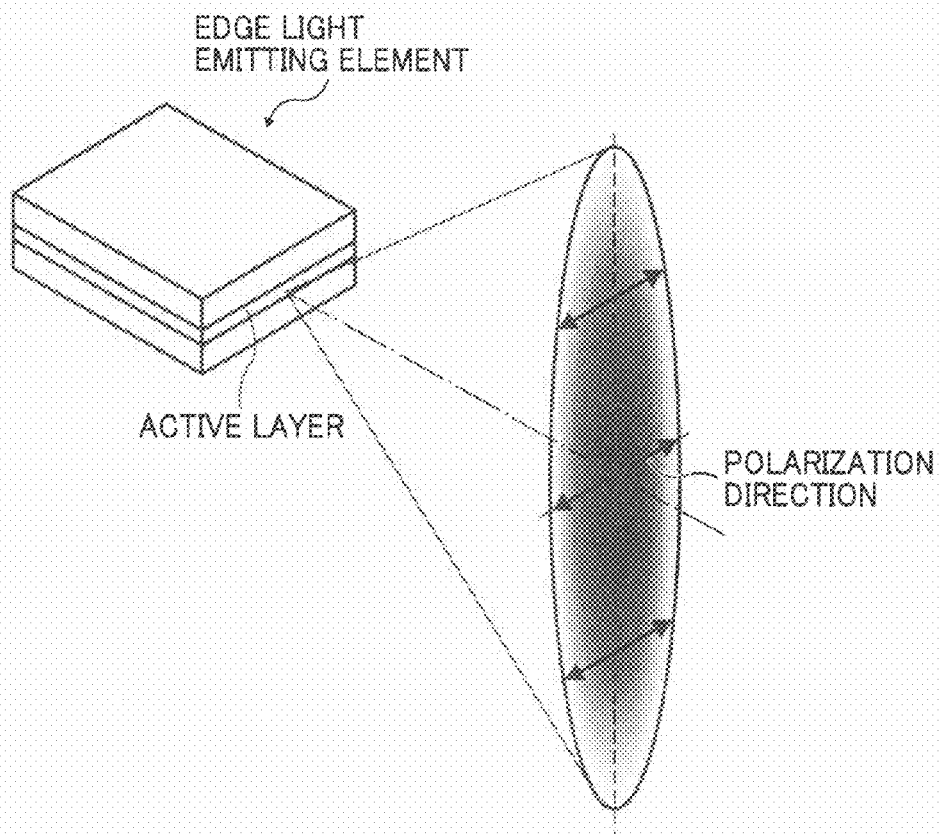
FIG. 43 is a diagram illustrating an end face light emitting element.

The edge light emitting element generally has a double heterojunction structure obtained by bonding p-type and n-type semiconductor materials. For example, it is known that laser light coming out of such a structure is polarized in a direction parallel to the active layer as shown in FIG. 43. In this regard, it is possible to make the polarization directions of the light beams output from each light source perpendicular to the incident plane of the polarization splitting surface by adjusting the installation position of each light source.

Figure 44:
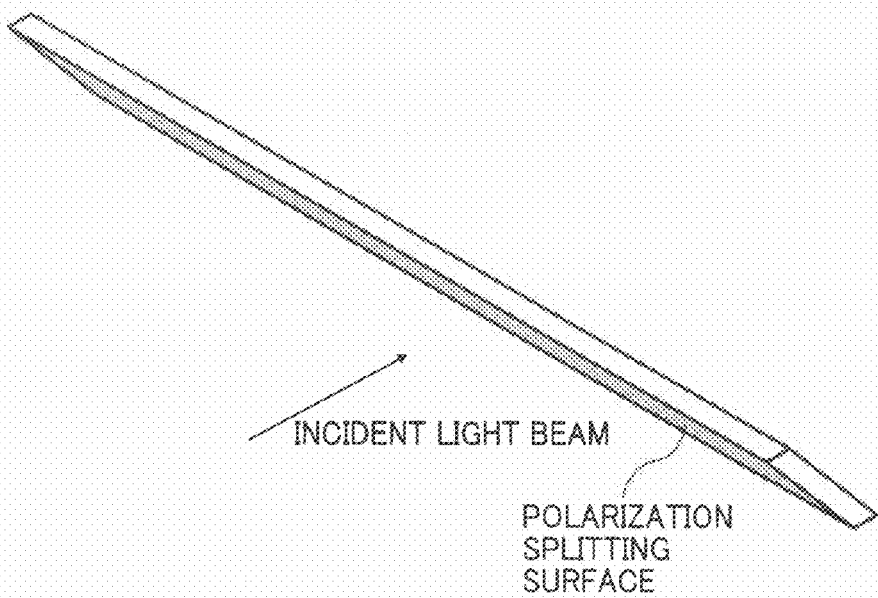
FIG. 44 is a diagram illustrating a modified example 1 of each polarization splitting element (2107A and 2107B) in a fourth configuration example of the optical scanning device.

In addition, a long parallel flat plate made of resin may be used as each polarization splitting element 2107A and 2107B as shown in FIG. 44. In this case, a light incidence plane serves as the polarization splitting surface and is structured using a wire grid surface on which metal thin wires of a nanometer size are regularly aligned. Such a wire grid pattern is designed based on the necessary polarization splitting characteristic.

Figure 45:
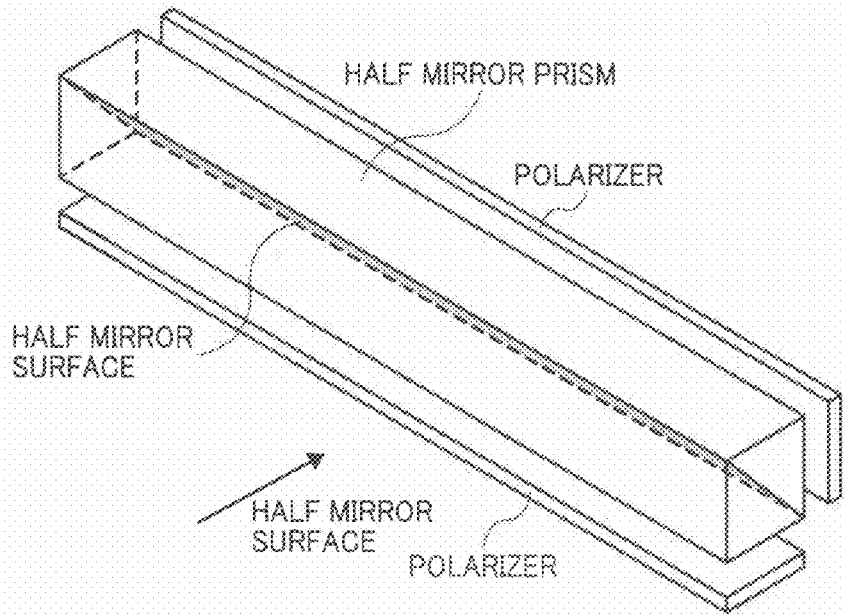
FIG. 45 is a diagram illustrating a modified example 2 of each polarization splitting element (2107A and 2107B) in a fourth configuration example of the optical scanning device.
Figure 46:
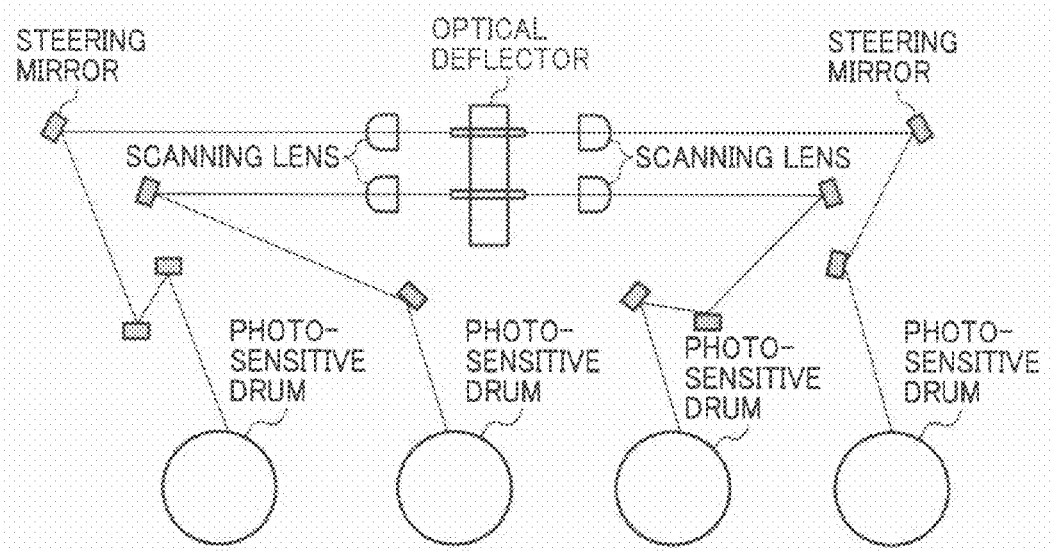
FIG. 46 is a diagram illustrating an exemplary optical scanning device of the related art.

In addition, a long half mirror made of resin and two polarizers may be used in each polarization splitting element 2107A and 2107B as shown in FIG. 45. In this case, polarization of the light beam split by the half mirror is selected using the polarizers orthogonal to each other.

While a case where the light beams output from each light source are S-polarized has been described herein, the invention is not limited thereto. The deflection direction may be different between the light beam LBa output from the light source 2200a and the light beam LBb output from the light source 2200b. For example, the light beam LBa output from the light source 2200a may be S-polarized, and the light beam LBb output from the light source 2200b may be P-polarized. In this case, the aforementioned half-wave plate A2 is not necessary. Similarly, the deflection direction may be different between the light beam LBc output from the light source 2200c and the light beam LBd output from the light source 2200d.

As described above, the color printer 2000 according to the present embodiment includes any one of the optical scanning devices 2010 of the first to fourth configuration examples. As a result, it is possible to achieve miniaturization while a high image quality is maintained without causing high cost.

However, typically, image forming units 2Y, 2M, 2C, and 2Y for performing development, charging, cleaning of the photosensitive drum, or reserving toner or discarded toner for each color are stored in space between the photosensitive drum and the optical scanning device. In this regard, if the size of the image forming device is allowable as it is, space for the image forming units inside the image forming device increases by thinning the optical scanning device. In this regard, since it is possible to increase a toner storage size, it is possible to reduce toner supply frequency of a user in comparison with the related art. In addition, since it is possible to increase the size of the photosensitive drum which is repeatedly driven for operations such as exposure, development, and cleaning, it is possible to improve integrity. In this manner, it is possible to remove cumbersomeness of a user caused by frequent maintenance or frequent toner supply by thinning the optical scanning device, it is possible to improve convenience of use.

While a case where the diffractive surface of the diffraction lens has a multiple step shape has been described in the aforementioned embodiments, the invention is not limited thereto. However, if the diffractive surface has a Fresnel lens shape, machining and molding become difficult.

In addition, while a case where each light source has an edge light emitting element as a light emitting element has been described in the aforementioned embodiment, the invention is not limited thereto. The light emitting element may include a vertical cavity surface emitting laser (VCSEL).

In the aforementioned embodiment, when wavelength difference is generated between the light beams LBa and LBb, the half mirror HM1 may be substituted with a dichroic mirror. Similarly, when wavelength difference is generated between the light beams LBc and LBd, the half mirror HM2 may be substituted with a dichroic mirror. Undesired light is also generated in either the transmitting side or the reflecting side when the wavelengths of the two light beams incident to the optical splitter (dichroic mirror) are different. Similarly, in this case, it is possible to readily split undesired light according to the aforementioned embodiment.

In addition, the present embodiment may also be applied to a direct transfer type in which a toner image is directly transferred from the photosensitive drum to the recording sheet.

While a case where the image carrier has a drum shape has been described in the aforementioned embodiment, the invention is not limited thereto. The image carrier may have a sheet or belt shape. For example, a zinc oxide sheet may be used as the photoconductive photosensitive element having a sheet shape.

In addition, while a case where the image forming device is applied to the color printer 2000 has been described in the aforementioned embodiment, the invention is not limited thereto. For example, the image forming device may be applied to an optical plotter or a digital copy machine.

In addition, the image carrier of the image forming device may be a silver salt film. In this case, a latent image is formed on the silver salt film through optical scanning, and such a latent image can be visualized through the same process as a development process of a typical silver salt photographing process. In addition, the image can be transferred to a printing sheet as a transferring target through the same process as a photoprinting process of a typical silver salt photographing process. Such an image forming device may be embodied as an optical printmaking apparatus or an optical portrayal apparatus for portraying a CT scan image or the like.

In addition, a coloring medium (positive photoprinting sheet) which is colored by thermal energy of a beam spot may be used in the image forming device as the image carrier. In this case, it is possible to directly form a visible image on the image carrier using optical scanning.

After all, if the image forming device has the aforementioned optical scanning device 2010, it is possible to achieve miniaturization while a high image quality is maintained without causing high cost as a result.

As described above, the optical scanning device of the invention is suitable to achieve miniaturization while optical scanning is consistently performed with high precision without causing high cost. Furthermore, the image forming device according to the invention is suitable to achieve miniaturization while a high image quality is maintained without causing high cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that individually scans a plurality of scanning target surfaces including first and second scanning target surfaces with respective light beams, the optical scanning device comprising:
a light source including a first light emitting portion that outputs a first light beam and a second light emitting portion that outputs a second light beam;
an optical deflector that deflects a plurality of light beams from the light source; and
a scanning optical system that includes an optical splitter that splits incident light into transmitted light and reflected light and individually guides each of the first and second light beams deflected by the optical deflector to corresponding one of the scanning target surfaces,
wherein the first and second light beams are incident to the optical splitter such that principal rays of the first and second light beams that are incident to the optical splitter are nonparallel to each other in a plane orthogonal to a main-scanning direction, and
the transmitted light of the first light beam from the optical splitter is guided to the first scanning target surface, the reflected light of the second light beam from the optical splitter is guided to the second scanning target surface, and the transmitted light of the second light beam from the optical splitter and the reflected light of the first light beam from the optical splitter reach none of the scanning target surfaces.

2. The optical scanning device according to claim 1, wherein the scanning optical system includes at least one reflective optical element that guides the transmitted light from the optical splitter out of the first light beam to the first scanning target surface, and
the transmitted light from the optical splitter out of the second light beam is not incident to the at least one reflective optical element.

3. The optical scanning device according to claim 1, wherein the scanning optical system includes at least one reflective optical element that guides the reflected light of the second light beam from the optical splitter to the second scanning target surface, and
the reflected light of the first light beam from the optical splitter is not incident to the at least one reflective optical element.

4. The optical scanning device according to claim 1, wherein the scanning optical system includes a plurality of reflective optical elements that guide the transmitted light of the first light beam from the optical splitter to the first scanning target surface, and
the transmitted light of the second light beam from the optical splitter is incident to only a part of the plurality of reflective optical elements.

5. The optical scanning device according to claim 1, wherein the scanning optical system includes a plurality of reflective optical elements that guide the reflected light of the second light beam from the optical splitter to the second scanning target surface, and the reflected light of the first light beam from the optical splitter is incident to only a part of a plurality of the reflective optical elements.

6. The optical scanning device according to claim 1, further comprising an output window through which the transmitted light of the first light beam from the optical splitter passes, wherein the transmitted light of the second light beam from the optical splitter is not incident to the output window.

7. The optical scanning device according to claim 1, further comprising an output window through which the reflected light of the second light beam from the optical splitter passes, wherein the reflected light of the first light beam from the optical splitter is not incident to the output window.

8. The optical scanning device according to claim 1, wherein the first and second light beams incident to the optical splitter have different polarization directions, and
the optical splitter is a polarization beam splitter.

9. The optical scanning device according to claim 8, wherein the first and second light beams output from the first and second light emitting portions, respectively, are equal in a polarization direction, and
a half-wave plate is provided on an optical path between the first light emitting portion and the optical splitter or an optical path between the second light emitting portion and the optical splitter.

10. The optical scanning device according to claim 1, wherein the first and second light beams have different wavelengths, and
the optical splitter is a dichroic mirror.

11. The optical scanning device according to claim 1, wherein the optical splitter is a half mirror.

12. The optical scanning device according to claim 1, wherein the first and second light beams incident to the optical deflector are separated from each other in a rotation-axis direction of the optical deflector.

13. The optical scanning device according to claim 12, wherein the first and second light emitting portions are separated from each other in a rotation-axis direction of the optical deflector.

14. The optical scanning device according to claim 1, further comprising:
a synthesizing element that is arranged on an optical path between the first and second light emitting portions and the optical deflector to direct the first and second light beams output from the first and second light emitting portions, respectively, to the same direction.

15. The optical scanning device according to claim 1, wherein the optical deflector and the scanning optical system are housed in an optical housing, and the transmitted light of the second light beam from the optical splitter and the reflected light of the first light beam from the optical splitter are guided to a wall of the optical housing.

16. The optical scanning device according to claim 1, wherein the scanning optical system has a scanning lens system including a scanning lens made of resin.

17. The optical scanning device according to claim 16, wherein the scanning lens system includes a single scanning lens made of resin.

18. The optical scanning device according to claim 1, wherein the first and second light beams are incident to the optical deflector through an incidence optical system, and
the incidence optical system includes a diffractive optical element.

19. The optical scanning device according to claim 1, wherein a lateral magnification of the scanning optical system in a sub-scanning direction is larger than 1.

20. An image forming device comprising:
a plurality of image carriers including first and second image carriers; and
an optical scanning device that individually scans a plurality of the image carriers using respective light beams modulated based on image information,
wherein the optical scanning device comprises:
a light source including a first light emitting portion that outputs a first light beam and a second light emitting portion that outputs a second light beam;
an optical deflector that deflects a plurality of light beams from the light source; and a scanning optical system that includes an optical splitter that splits incident light into transmitted light and reflected light and individually guides each of the first and second light beams deflected by the optical deflector to corresponding one of the image carriers, wherein the first and second light beams are incident to the optical splitter such that principal rays of the first and second light beams that are incident to the optical splitter are nonparallel to each other in a plane orthogonal to a main-scanning direction, and the transmitted light of the first light beam from the optical splitter is guided to the first image carrier, the reflected light of the second light beam from the optical splitter is guided to the second image carrier, and the transmitted light of the second light beam from the optical splitter and the reflected light of the first light beam from the optical splitter reach none of the image carriers.

* * * * *